(12) United States Patent
Woffinden

(10) Patent No.: US 8,930,635 B2
(45) Date of Patent: Jan. 6, 2015

(54) PAGE INVALIDATION PROCESSING WITH SETTING OF STORAGE KEY TO PREDEFINED VALUE

(75) Inventor: Gary A. Woffinden, Overland Park, KS (US)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 12/636,818

(22) Filed: Dec. 14, 2009

(65) Prior Publication Data

US 2011/0145511 A1 Jun. 16, 2011

(51) Int. Cl.
| G06F 12/00 | (2006.01) |
| G06F 12/10 | (2006.01) |
| G06F 12/08 | (2006.01) |
| G06F 13/00 | (2006.01) |
| G06F 13/28 | (2006.01) |

(52) U.S. Cl.
CPC ........ *G06F 12/0808* (2013.01); *G06F 12/1027* (2013.01); *G06F 12/0815* (2013.01)
USPC .............. 711/141; 711/156; 711/206; 712/32

(58) Field of Classification Search
CPC ............ G06F 12/0808; G06F 12/1027; G06F 12/0815
USPC .............................. 711/206, 156, 141; 712/32
See application file for complete search history.

(56) References Cited

U.S. PATENT DOCUMENTS

| 5,551,013 A | 8/1996 | Beausoleil et al. |
| 5,574,873 A | 11/1996 | Davidian |
| 5,675,763 A | 10/1997 | Mogul et al. |
| 5,790,825 A | 8/1998 | Traut |
| 5,895,489 A | 4/1999 | Hammond et al. |

(Continued)

FOREIGN PATENT DOCUMENTS

| EP | 0550287 A2 | 7/1993 |
| EP | 0600112 A1 | 8/1994 |
| JP | 04-111133 A | 4/1992 |

OTHER PUBLICATIONS

Jacob, Bruce., "Virtual Memory Systems and TLB Structures", 2001, Dept. Electrical & Computer Engineering, University of Maryland at College Park, pp. 1-17.

(Continued)

*Primary Examiner* — Sanjiv Shah
*Assistant Examiner* — Mark Giardino, Jr.
(74) *Attorney, Agent, or Firm* — Steven Chiu, Esq.; Kevin P. Radigan, Esq.; Heslin Rothenberg Farley & Mesiti P.C.

(57) ABSTRACT

Processing within a multiprocessor computer system is facilitated by: setting, in association with invalidate page table entry processing, a storage key at a matching location in central storage of a multiprocessor computer system to a predefined value; and subsequently executing a request to update the storage key to a new storage key, the subsequently executing including determining whether the predefined value is an allowed stale value, and if so, replacing in central storage the storage key of predefined value with the new storage key without requiring purging or updating of the storage key in any local processor cache of the multiprocessor computer system, thus minimizing interprocessor communication pursuant to processing of the request to update the storage key to the new storage key.

9 Claims, 31 Drawing Sheets

(56) References Cited

U.S. PATENT DOCUMENTS

| | | | |
|---|---|---|---|
| 6,009,261 | A | 12/1999 | Scalzi et al. |
| 6,119,219 | A | 9/2000 | Webb et al. |
| 6,308,255 | B1 | 10/2001 | Gorishek, IV et al. |
| 6,463,582 | B1 | 10/2002 | Lethin et al. |
| 6,823,431 | B2 | 11/2004 | Freerksen et al. |
| 6,883,077 | B2 | 4/2005 | Kimura et al. |
| 6,996,698 | B2 | 2/2006 | Slegel et al. |
| 7,197,601 | B2 | 3/2007 | Slegel et al. |
| 7,281,115 | B2 | 10/2007 | Siegel et al. |
| 7,284,100 | B2 | 10/2007 | Slegel et al. |
| 7,287,124 | B2 | 10/2007 | Cohen |
| 7,363,463 | B2 | 4/2008 | Sheu et al. |
| 7,383,415 | B2 | 6/2008 | Jordan et al. |
| 7,472,253 | B1 | 12/2008 | Cameron et al. |
| 7,496,730 | B2 | 2/2009 | Wang et al. |
| 2004/0123040 | A1 | 6/2004 | Jung et al. |
| 2006/0036824 | A1 | 2/2006 | Greiner et al. |
| 2006/0161734 | A1 | 7/2006 | Cohen |
| 2006/0294288 | A1 | 12/2006 | Seth et al. |
| 2007/0005932 | A1 | 1/2007 | Covelli et al. |
| 2007/0186075 | A1 | 8/2007 | Slegel et al. |
| 2007/0271432 | A1 | 11/2007 | Greiner |
| 2007/0277014 | A1 | 11/2007 | Greiner |
| 2008/0201540 | A1 | 8/2008 | Sahita et al. |
| 2008/0215830 | A1 | 9/2008 | Bohizic et al. |
| 2008/0215848 | A1 | 9/2008 | Sheu et al. |
| 2008/0256333 | A1 | 10/2008 | Keltos et al. |
| 2008/0263301 | A1 | 10/2008 | Mathews et al. |
| 2008/0301369 | A1 | 12/2008 | Woffinden et al. |
| 2008/0320216 | A1 | 12/2008 | Fertig et al. |
| 2010/0250895 | A1* | 9/2010 | Adams et al. ............ 711/207 |
| 2011/0145510 | A1 | 6/2011 | Woffinden |
| 2012/0159080 | A1 | 6/2012 | Donley et al. |
| 2012/0203967 | A1 | 8/2012 | Woffinden |

OTHER PUBLICATIONS

Slegel, T.J., Pfeffer, E., Magee, J.A., "The IBM eServer z990 Microprocessor", IBM Journal of Research and Development, vol. 48, No. 3/4, p. 295 (2004).

Schwarz, E.M., et al., "The Mircoarchitecture of the IBM eServer z900 Processor," IBM Journal of Research and Development, vol. 46, No. 4/5, p. 381 (2002).

z/Architecturee® Principles of Operation, IBM Publication No. SA22-7832-07, Feb. 2009.

Woffinden, Jr., Gary, Office Action for U.S. Appl. No. 13/451,659, filed Apr. 20, 2012, dated Jul. 27, 2012.

Woffinden, Gary A., Final Office Action for U.S. Appl. No. 13/451,659, filed Apr. 20, 2012 (U.S. Publication No. 2012/0203984 A1), dated Dec. 17, 2012., pp. 1-14.

Woffinden, Gary A., Office Action for U.S. Appl. No. 12/636,817, filed Dec. 14, 2009 (U.S. Patent Publication No. 2011/0145510 A1), dated Aug. 15, 2012, pp. 1-9.

Woffinden, Gary A., Notice of Allowance for U.S. Appl. No. 12/636,817, filed Dec. 14, 2009 (U.S. Patent Publication No. 2011/0145510 A1), dated Dec. 3, 2012, pp. 1-9.

Woffinden, Gary A., Office Action for U.S. Appl. No. 13/447,537, filed Apr. 16, 2012 (U.S. Patent Publication No. 2012/0203967 A1), dated Aug. 16, 2012., pp. 1-8.

Woffinden, Gary A., Notice of Allowance for U.S. Appl. No. 13/447,537, filed Apr. 16, 2012 (U.S. Patent Publication No. 2012/0203967 A1), dated Dec. 3, 2012., pp. 1-9.

Gary A. Woffinden, Notice of Allowance for U.S. Appl. No. 13/447,537, filed Apr. 16, 2012 (U.S. Patent Publication No. 2012/0203967 A1), dated Apr. 24, 2013, pp. 1-10.

Gary A. Woffinden, Notice of Allowance for U.S. Appl. No. 12/636,817, filed Dec. 14, 2009 (U.S. Patent Publication No. 2011/0145510 A1), dated Apr. 11, 2013, pp. 1-10.

* cited by examiner

| TLB.key FIELD | UNIVERSAL STALE VALUE(S) | SSKE CONDITIONAL STALE VALUES | | |
|---|---|---|---|---|
| | | MR, MC 01 | MR, MC 10 | MR, MC 11 |
| ACCESS | 0<br>0<br>0<br>0 | 0<br>0<br>0<br>0 | 0<br>0<br>0<br>0 | 0<br>0<br>0<br>0 |
| FETCH-PROTECT | 1 | 1 | 1 | 1 |
| REFERENCE BIT | 0 | 0 | X | X |
| CHANGE BIT | 0 | X | 0 | X |

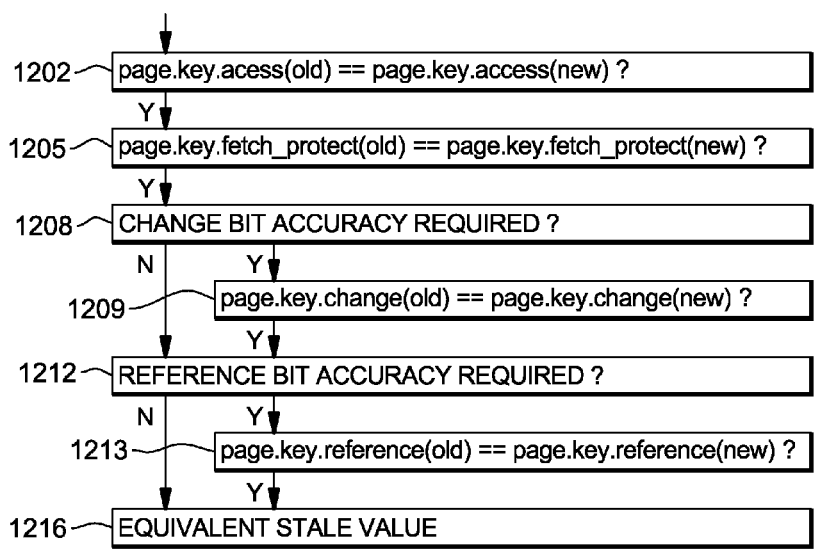

| page.key FIELD | TLB.key FIELD | request.key FIELD |
|---|---|---|
| ACCESS | ACCESS | ACCESS |
| FETCH-PROTECT | FETCH-PROTECT | - |
| REFERENCE BIT | REFERENCE BIT | - |
| CHANGE BIT | CHANGE BIT | - |
| PAGE INITIALIZE BIT | - | - |

FIG. 17

| SSKE | B | 2 | 2 | B | M3 | ///// | R1 | R2 |

FIG. 19A

| SSKE R1 | ///////////////////////////////////////////// | KEY | Pi |
| | 0 | 56 57  59 60 61 62 | 63 |

FIG. 19B

| SSKE M3 FIELD FUNCTIONALITY |||
|---|---|---|
| FACILITY INSTALLED | M3 VALUE | KEY LENGTH |
| NO | x | 7 |
| YES | 0xxx | 7 |
| YES | 1xxx | 8 |

FIG. 19C

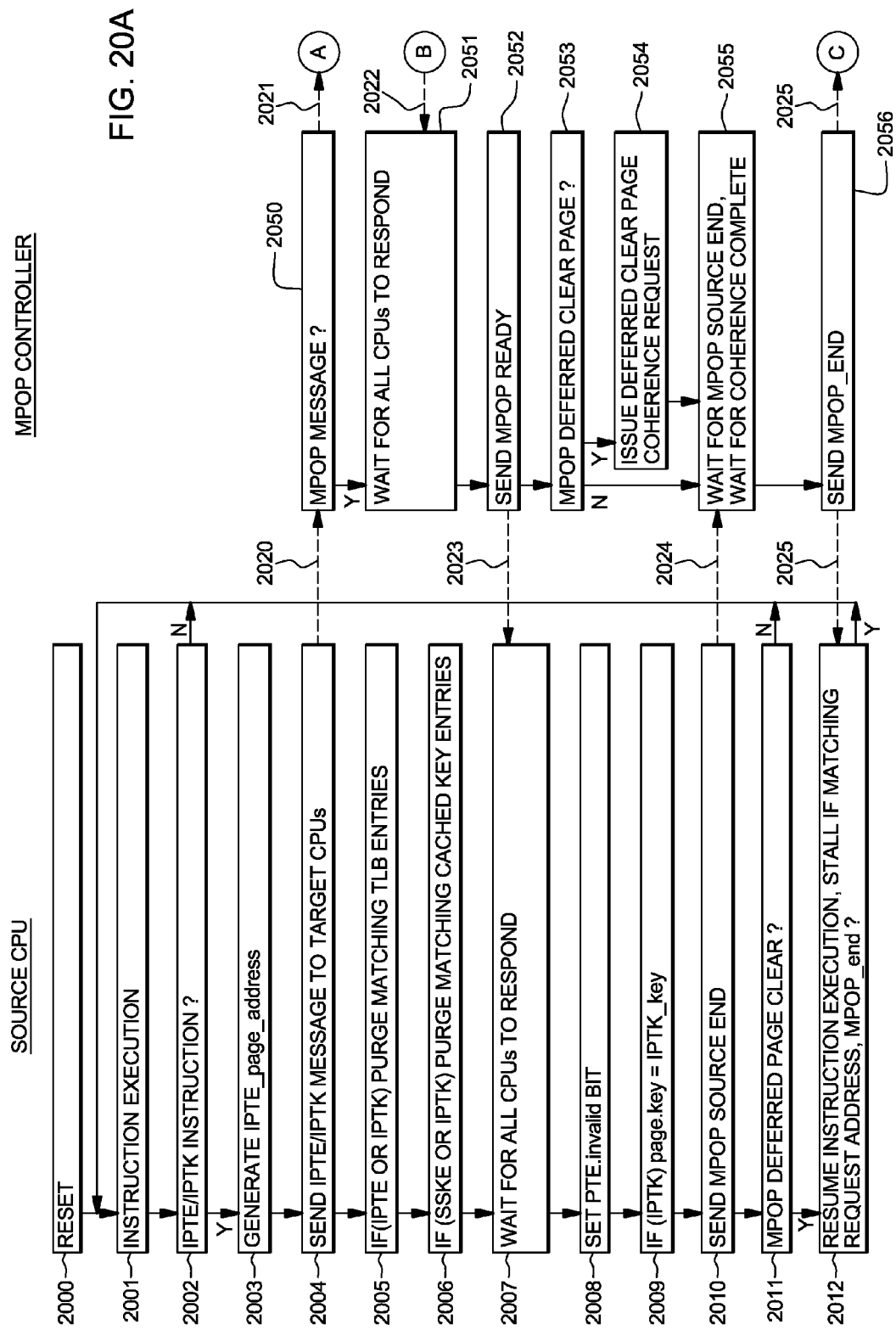

| STATUS | PAGE ADDRESS | LINE STATE | |
|---|---|---|---|
| 0 | | | |
| 1 | | | |
| 2 | | | |
| * | *** | *** | |
| n-2 | | | |
| n-1 | | | |

FIG. 22A

PAGE INVALIDATION PROCESSING WITH SETTING OF STORAGE KEY TO PREDEFINED VALUE

BACKGROUND

This invention relates in general to processing within a multiprocessor computer system, and more particularly, to page table invalidation, page clearing and storage key handling within a multiprocessor computer system.

Various existing computing environments, such as those based, for instance, on the z/Architecture®, offered by International Business Machines Corporation, Armonk, N.Y., employ storage keys to facilitate processing within a computing environment. As one example, a storage key is associated with each block of real storage (also referred to as a frame). One function of a storage key is to provide a reliability mechanism that is used to segregate blocks of storage, ensuring that programs executing in one key do not improperly store into or, subject to a control in the key, fetch from blocks having a different key. A further function is to provide indications to an operating system as to which blocks have been referenced and changed, thus allowing the operating system to determine which blocks may need to be written to auxiliary storage.

A storage key is set, in one example, by a Set Storage Key Extended (SSKE) instruction, offered by International Business Machines Corporation, Armonk, N.Y. This instruction sets all of the constituent components of the key simultaneously.

To improve system performance, a processor may buffer a subset of the storage keys in a local (processor-specific) area. However, when a storage key is changed, then all processors in a multiprocessor coherence domain are to effectively observe the change coherently, such that stale local copies of the key are discarded or updated to the changed value. In one example, the Set Storage Key Extended instruction requires the system to be serialized to ensure that all CPUs observe the changes to the key. This serialization may be performed in hardware using a fast quiesce mechanism, as an example.

When executing the Set Storage Key Extended operation with the fast quiesce mechanism, all processors within the same domain as the requestor may be quiesced. That is, each is to reach an interruptible point to honor the fast quiesce request. When honoring the request, the processors purge any locally buffered copies of the key and all processors in that zone, besides the one that initiated the quiesce, resume execution but are prevented from accessing the relevant frame, while the operation is being performed. From an implementation perspective, the system quiesce is used to ensure that any local copy of the key is not out of date with respect to the system key and prevent inconsistent views of the key during the operation.

However, there is a large overhead associated with the hardware quiesce mechanism used to implement the Set Storage Key Extended instruction. For instance, only a limited number of quiesce operations (e.g., one in many environments) can be performed in the system at a time and the quiesce operations must be serialized in the storage controller hardware. This results in a large system impact for each quiesce, and therefore, for each update of the storage keys.

Similarly, the life cycle of a virtual page will typically include execution of an Invalidate Page Table Entry instruction to invalidate the associated page table entry for de-allocating the page from use. The Invalidate Page Table Entry instruction also typically has a large overhead associated with a required quiesce mechanism used to purge any cached copies of stale DAT translation results from local processor caches in the multiprocessor system.

In addition, the deallocation or reallocation of a virtual page frame to a new user conventionally has long latencies associated with one or more processors first clearing, and then subsequently fetching cleared lines of data from central storage. For example, for a 4 k-byte page frame and a 256-byte data line size, clearing the page data may consume 16 line stores, while fetching the cleared lines may additionally require 16 central storage fetches.

BRIEF SUMMARY

In one aspect, provided herein is a method of facilitating processing of a multiprocessor computer system. The method includes: setting, in association with invalidate page table entry processing, a storage key at a matching location in central storage of the multiprocessor computer system to a predefined value; and subsequently executing a request to update the storage key to a new storage key, the subsequently executing including determining whether the predefined value is an allowed state value, and if so, replacing in central storage the storage key of predefined value with the new storage key without requiring updating of the storage key in any local processor cache of the multiprocessor computer system, thereby minimizing interprocessor communication pursuant to processing of the request to update the storage key to the new storage key.

In another aspect, a computer system is provided for facilitating processing of a multiprocessor computer system. The computer system includes a memory, and a processor in communications with the memory, wherein the computer system is capable of performing a method. The method includes: setting, in association with invalidate page table entry processing, a storage key at a matching location in central storage of the multiprocessor computer system to a predefined value; and subsequently executing a request to update the storage key to a new storage key, the subsequently executing including determining whether the predefined value is an allowed stale value, and if so, replacing in central storage the storage key of predefined value with the new storage key without requiring purging or updating of the storage key of predefined value in any local processor cache of the multiprocessor computer system, thereby minimizing interprocessor communication pursuant to processing of the request to update the storage key to the new storage key.

In a further aspect, provided herein is a computer program product for facilitating processing of a multiprocessor computer system. The computer program product includes a storage medium readable by a processing circuit and storing instructions for execution by the processing circuit for performing a method, which includes: setting, in association with invalidate page table entry processing, a storage key at a matching location in central storage of the multiprocessor computer system to a predefined value; and subsequently executing a request to update the storage key to a new storage key, the subsequently executing including determining whether the predefined value is an allowed stale value, and if so, replacing in central storage the storage key of predefined value with the new storage key without requiring purging or updating of the storage key of predefined value in any local processor cache of the multiprocessor computer system, thereby minimizing interprocessor communication pursuant to processing of the request to update the storage key to the new storage key.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 11A depicts one embodiment of an Invalidate Page Table Entry (IPTE) instruction and an Invalidate DAT Table Entry (IDTE) instruction incorporating one or more aspects of the present invention;

FIG. 11B depicts one embodiment of the R3 field of an invalidate page table entry instruction and an invalidate DAT table entry instruction, in accordance with an aspect of the present invention;

FIG. 11C depicts one embodiment of the M4 field of an invalidate page table entry instruction and an invalidate DAT table entry instruction, in accordance with an aspect of the present invention;

FIG. 12 depicts one embodiment of processing for ascertaining that a previous storage key is an equivalent stale value to a new storage key, which is employed in accordance with an aspect of the present invention;

FIG. 17 depicts one embodiment of a request key format in accordance with one or more aspects of the present invention;

FIG. 19A depicts one embodiment of a Set Storage Key Extended (SSKE) instruction to be modified in accordance with an aspect of the present invention;

FIG. 19B depicts one embodiment of the R1 field of the Set Storage Key Extended instruction of FIG. 19A, modified in accordance with an aspect of the present invention;

FIG. 19C depicts one embodiment of the M3 field of the Set Storage Key Extended instruction of FIG. 19A, modified in accordance with an aspect of the present invention;

FIGS. 20A & 20B depict an embodiment of an Invalidate Page Table entry and set storage Key (IPTK) processing at a source processor, storage controller, and related MPOP processing at one or more target processors in the multiprocessor computer system, in accordance with an aspect of the present invention;

FIG. 22A illustrates one embodiment of system controller intervention state machine content, in accordance with an aspect of the present invention;

DETAILED DESCRIPTION

Figure 1:
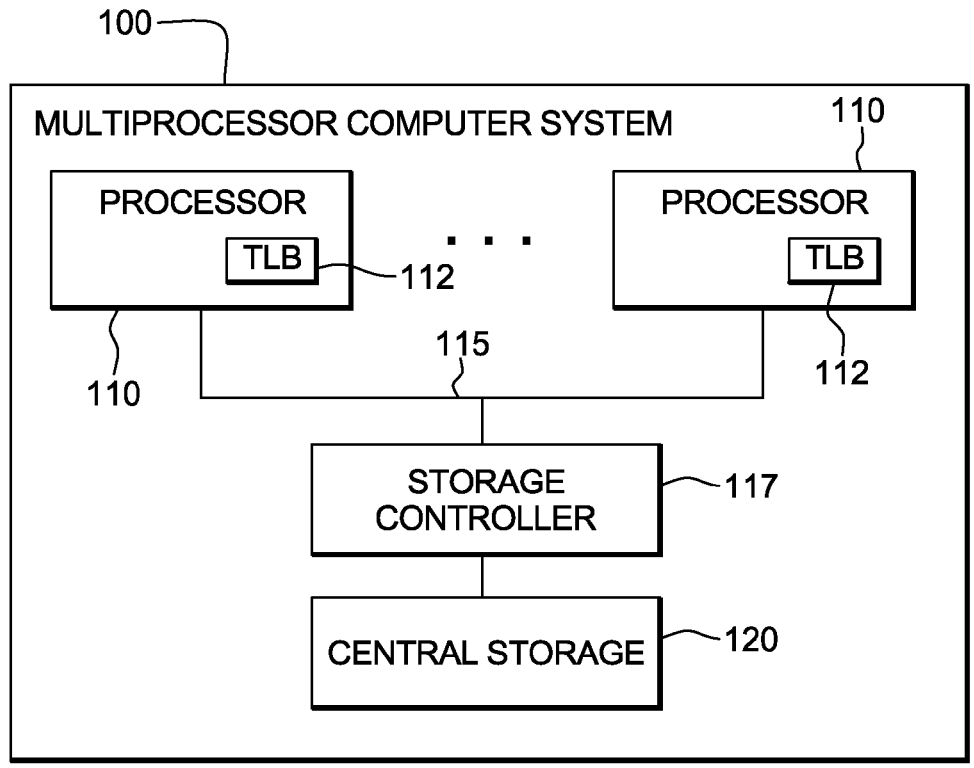
FIG. 1 is a block diagram of one embodiment of a multi-processor computer system to incorporate and use one or more aspects of the present invention.

In accordance with an aspect of the present invention, a processing facility is provided for reducing interprocessor communications during updating of one or more storage keys in a multiprocessor computer system. Interprocessor communications are reduced (in one aspect) by deciding, pursuant to processing a request to update a previous storage key to a new storage key, whether to purge the previous storage key from, or update the previous storage key in, any local processor cache of the multiprocessor computer system. This deciding includes comparing a bit value(s) of one or more required components of the previous storage key to predefined allowed stale value(s) for the required component(s), and leaving the previous storage key in any local processor cache of the multiprocessor computer system if the bit value(s) of the required component(s) in the previous storage key equals the predefined allowed stale value(s) for the required component(s), notwithstanding mismatching thereof with the corresponding required component bit value in the new storage key. This leaving of the previous storage key in local processor cache minimizes interprocessor communication pursuant to processing of the request to update the previous storage key to the new storage key by avoiding, for example, any need to send out a quiesce command to other processors in a coherence domain employing the storage key being updated. Note that, as used herein, the phrase "previous storage key" refers to any existing stale storage key resulting from the current or a prior updating of the storage key in central storage (i.e., the page.key). Those skilled in the art will note from the following discussion that the term "previous storage key" can thus encompass any earlier, stale version of the storage key held in local processor cache, that is, besides the most recent version of the storage key (page.key) being updated in central storage.

In one specific example, interprocessor communications are reduced by determining by a processor performing an update storage key request (e.g., a Set Storage Key Extended (SSKE) instruction), whether to purge or update a stale copy of the storage key in local processor cache of one or more other processors of the multiprocessor computer system. Advantageously, in accordance with one aspect of the present invention, the stale copy of the storage key in local processor cache is allowed to remain in local processor cache if, in response to an attempted access to storage by a processor using the stale copy of the storage key, the stale copy will either be updated before a protection exception can be issued or will not allow the processor access to unauthorized storage (i.e., produces correct results in a data access protect analysis using the previous storage key). If these conditions are guaranteed, then the stale copy of the storage key (i.e., the previous storage key) is allowed to remain in local processor cache, notwithstanding processing of the update storage key request.

In accordance with another aspect of the present invention, an enhancement of the above-described processing facility is provided via a variation on an Invalidate Page Table Entry (IPTE) instruction and a variation on an Invalidate DAT Table Entry (IDTE) instruction. As described further below, the modified IPTE and modified IDTE instructions presented herein may be used to: invalidate a page table entry or entries; conditionally clear a page; conditionally set the storage key to a universal stale value; purge stale cached copies of DAT translation results; and conditionally purge stale cached copies of the storage key. If the storage key is set to (for example) a universal stale value by an Invalidate Page Table entry and set storage Key (IPTK) or an Invalidate DAT Table entry and set storage Key (IDTK) instruction, and retains the universal stale value until a subsequent update storage key request instruction is issued, updating of any stale cache key values may be avoided, thereby improving performance since the update storage key request need not purge stale cached key entries. Further, page initialization instructions may be architecturally defined to not set the storage key reference and change bits to retain the storage key in the universal stale value in central storage until an update storage key request is executed.

In accordance with a further aspect of the present invention, an enhancement of the above-described processing facility is provided via a variation on an Invalidate Page Table entry and set storage Key (IPTK) instruction or a Set Storage Key Extended (SSKE) instruction, wherein responsive to (for example) deallocating a page in central storage of the multiprocessor computer system, a page initialize bit is set for a data page in association with the IPTK or SSKE to a clear data value to logically clear the page without actually physically clearing data from the data page; and subsequent to the setting of the page initialize bit, data from the page is physically cleared responsive to a first access to the page with the page initialize bit set to the clear data value, thus overall minimizing time require to both clear and subsequently access the cleared data page in central storage of the multiprocessor computer system.

The above-described aspects, as well as other features and aspects of the present invention, are described further below with reference to the figures.

One embodiment of a multiprocessor system 100 to incorporate and use one or more aspects of the present invention is depicted in FIG. 1. Multiprocessor system 100 is based, for instance, on the z/Architecture®, offered by International Business Machines Corporation, Armonk, N.Y. The z/Architecture® is described in an IBM® publication entitled "z/Architecture® Principles of Operation", IBM Publication No. SA22-7832-07, February 2009, which is hereby incorporated herein by reference in its entirety. (IBM® and z/Architecture® are registered trademarks of International Business Machines Corporation, Armonk, N.Y., USA. Other names used herein may be registered trademarks, trademarks or a product name of International Business Machines Corporation, or other companies.)

Figure 2:
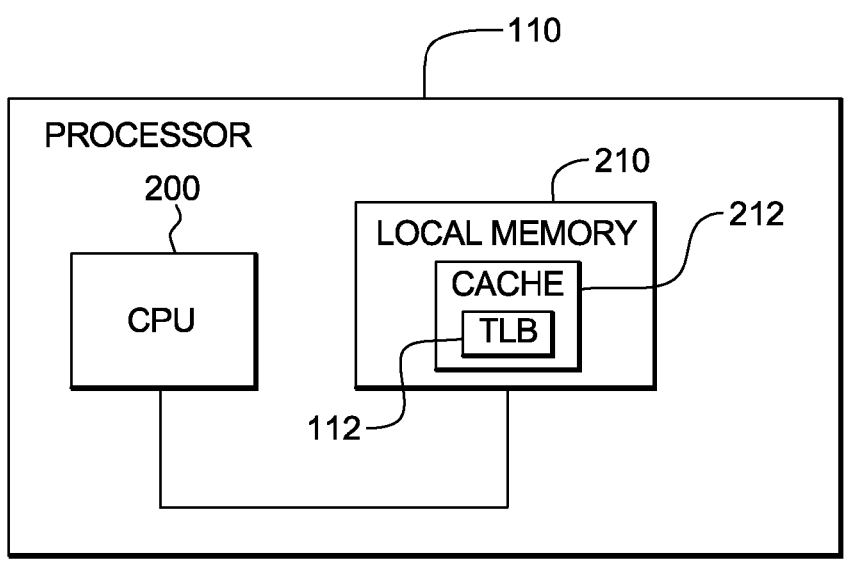
FIG. 2 depicts one embodiment of a processor of the multiprocessor computer system of FIG. 1, to incorporation and use one or more aspects of the present invention.

As one example, multiprocessor computer system 100 includes multiple processors, coupled together, and to a central storage 120, via one or more busses 115 and a storage controller 117. As shown in FIG. 2, each processor 110 includes a central processing unit (CPU) 200 and local memory 210, coupled to one another via, for example, one or more buses or other connections. In this example, local memory 210 includes (or is) a cache 212. To facilitate memory access, some architectures, such as the z/Architecture®, use a translation lookaside buffer (TLB) 112, to store addresses that have been translated. In accordance with this invention, TLB 112 may contain one or more storage keys for storage protection checking and reference and change bit recording for CPU storage accesses. The storage keys held in TLB 112 of local processor cache are referred to as the TLB.keys, while the storage keys held in central storage 120 are referred to herein as the page.keys.

Figure 3A:
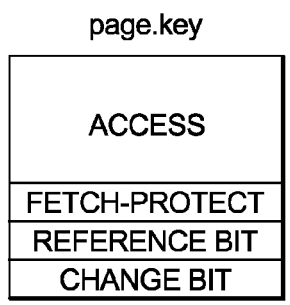
FIG. 3A depicts one embodiment of components of a storage key (labeled page.key) in central storage, which is to be updated pursuant to update storage key request processing, in accordance with an aspect of the present invention.
Figure 3B:
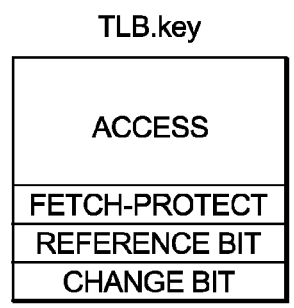
FIG. 3B depicts one embodiment of components of a local processor-cached copy of the storage key (labeled TLB.key), which is to be selectively updated in accordance with one or more aspects of the present invention.

FIG. 3A illustrates one embodiment of a key format for a storage key held in central storage (i.e., the page.key). As illustrated, the page.key includes an access component, a fetch protect component, a reference bit component, and a change bit component, which are understood in the art and described further below. The locally cached copy of the storage key, that is, the TLB.key, is illustrated in FIG. 3B as also including the access component, fetch protect component, reference bit component and change bit component of the storage key. In accordance with this invention, the TLB.key components may be the same or different from the page.key components, depending upon whether a previous storage key is (or was) allowed to remain in local processor cache, notwithstanding updating of the storage key in central storage, that is, notwithstanding updating of the page.key. This is described further below.

Figure 3C:
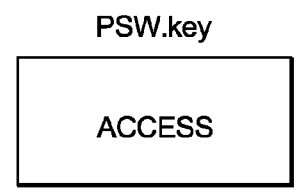
FIG. 3C depicts one embodiment of a program status word (PSW.key), employed in controlling execution of a program and used in a data access request, in accordance with an aspect of the present invention.

FIG. 3C depicts a program status word key (PSW.key), which is employed to control execution of a program, and is evaluated pursuant to a data access request, as described below.

As one approach to reducing interprocessor communication during an update storage key request, the SSKE instruction description in the above-referenced and incorporated z/Architecture® Principles of Operation improves system performance by allowing a processor executing an SSKE to skip the updating of the storage key in central storage (i.e., the page.key), and also skip the purging of locally cached copies of the storage key (i.e., the TLB.key) from one or more other processors in a coherence domain if each of the following four conditions are met:
1. {page.key.access (new)==page.key,access (old)}
2. {page.key.fetch_protect (new)==page.key.fetch_protect (old)}
3. {SSKE.reference_bit accuracy not required} OR {page.key.reference_bit (new)==page.key.reference_bit (old)}
4. {SSKE.change_bit accuracy not required} OR {page.key.change_bit (new)==page.key.change_bit (old)}

Figures 4, 5:
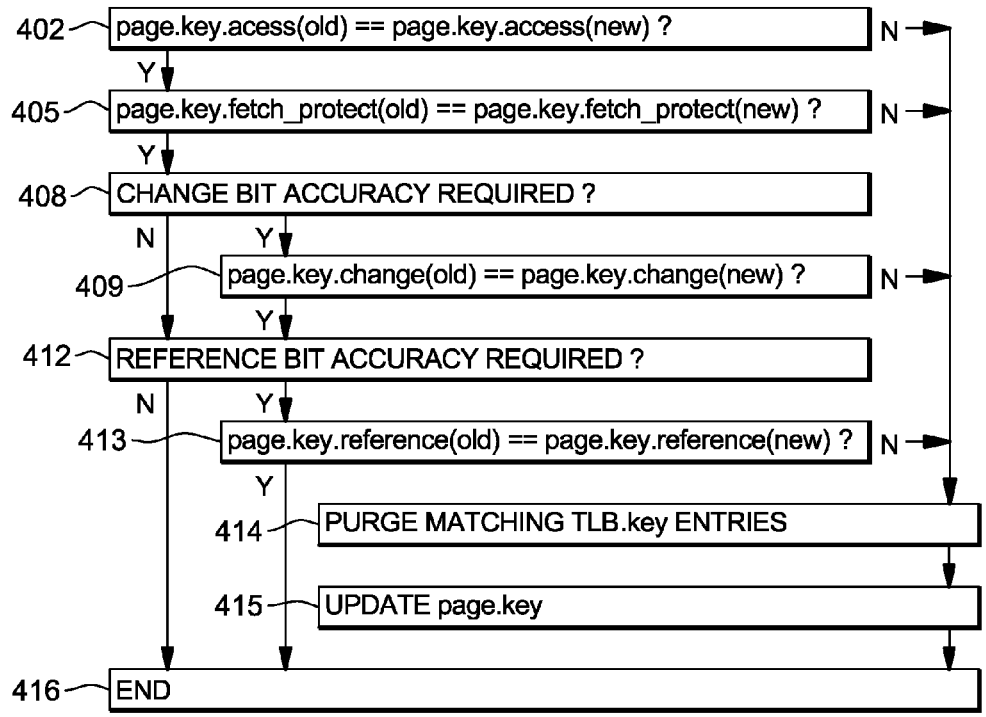
FIG. 4 depicts one embodiment of a process for determining whether to update a previous storage key in local processor cache, pursuant to processing of a request to update a previous storage key to a new storage key.
FIG. 5 depicts one embodiment of predefined universal and conditional stale values for the TLB.key components (or fields) of the storage key in local processor cache, in accordance with an aspect of the present invention.

Using the above approach, a processing flow for determining whether an SSKE instruction can skip modifying the page.key and purging the TLB.key entries is depicted in FIG. 4. If the access component of the previous storage key in central storage (i.e., the page.key.access (old)) matches the access component of the new storage key (i.e., page.key.access (new)) 402, then any stale copy of the storage key will have the correct access component value, and processing continues to test the fetch protect component of the storage key 405. However, if the access component of the previous storage key mismatches the access component of the new storage key, then processing purges any matching TLB.key entries 414 and updates the page.key in central storage 415 before completing processing 416. If the fetch protect component of the previous storage key (page.key.fetch_protect (old)) matches the fetch protect component of the new storage key (page.key.fetch_protect (new)) 405, then any stale copy of the storage key will have the correct fetch protect component, and processing moves on to test the change bit component of the storage key 408. However, if the fetch protect component of the previous storage key mismatches the fetch protect component of the new storage key, then processing purges any matching TLB.key entries in local processor cache 414, and updates the page.key in central storage 415 with the new storage key, before completing processing 416.

Processing continues with determining whether change bit accuracy is required 408. If so, the change bit component of the previous storage key in central storage (page.key.change (old)) is compared against the change bit component of the new storage key (page.key.change (new)) 409, and if they match, processing proceeds to determine whether reference bit accuracy is required 412. If change bit accuracy is not required, then processing proceeds directly to inquiry 412. On the other hand, if change bit accuracy is required, and the change bit component of the previous storage key is different from the change bit component of the new storage key, then processing purges any matching TLB.key entries from local processor cache 414, and updates the page.key entry in central storage with the new storage key 415, before completing processing 416.

If reference bit accuracy is required, then processing determines whether the reference bit component of the previous storage key (page.key.reference (old)) matches the reference bit component of the new storage key (page.key.reference (new)) 413, and if so, or if reference bit accuracy is not required, processing is completed 416. Otherwise, any matching TLB.key entries in local processor cache of in the domain are purged 414, and the page.key is updated in central storage with the new storage key 415, which completes processing 416.

With the above overview, disclosed herein (in one aspect) are additional conditions for allowing a processor executing an update storage key instruction to skip the purging or updating of locally cached copies of the storage key (i.e., the TLB.key) from one or more processors in a coherence domain of a multiprocessor computer system.

As one embodiment, the present invention improves SSKE instruction execution by allowing a processor executing an SSKE update to skip the purging or updating of any locally cached copies of the storage key (i.e., the TLB.key) from the processors in the coherence domain, in accordance with the following conditions being met:
1. {page.key.access (new)==page.key,access (old)} OR {page.key.access (old)==0}
2. {page.key.fetch_protect (new)==page.key.fetch_protect (old)} OR {page.key.fetch_protect (old)==1}
3. {SSKE.reference_bit accuracy not required} OR {page.key.reference_bit (new)==page.key.reference_bit (old)} OR {page.key.reference_bit (old)==0}
4. {SSKE.change_bit accuracy not required} OR {page.key.change_bit (new)==page.key.change_bit (old)} OR {page.key.change_bit (old)==0}

In accordance with the above, each stale TLB.key component may either (a) have a stale value which matches the corresponding new page.key component, or (b) have an allowed stale value(s), as shown in FIG. 5. Specifically, for an SKEE implementation, the allowed stale value(s) for the storage key access component is a value 0x0, the allowed stale value for the fetch protect component is a value 1. If the SSKE instruction M-field MR bit is 1, the reference bit component of the TLB.key allowed stale value may be 0 or 1 (any stale value is allowed), however, if the reference component is required (and thus, the reference bit component is a required component), then the reference bit allowed stale value(s) is a value 0. Similarly, if the SSKE instruction M-field MC bit is 1, then the TLB.key change bit component is allowed a stale value of 0 or 1 (i.e., any stale value is allowed for the change bit component), otherwise the change bit component is a required component, and the change bit allowed stale value is a value 0.

As explained further below, the above-noted allowed stale TLB.key.access and TLB.key.fetch_protect component values (0 and 1, respectively) will not incorrectly allow storage access, but may incorrectly predict a protection violation. Therefore, when a protection violation is predicted, the TLB.key (i.e., the storage key in the local processor cache) is compared to the page.key (i.e., the storage key in central storage), and if the keys match, a protection exception is posted. Otherwise, the TLB.key is refreshed, and the data access protect analysis is automatically performed again using the refreshed TLB.key. Note that the allowed stale TLB.key.reference_bit and TLB.key.change_bit values of 0 may result in architecturally invisible and acceptable redundant setting of the page.key.reference_bit and page.key.change_bit.

Figure 6:
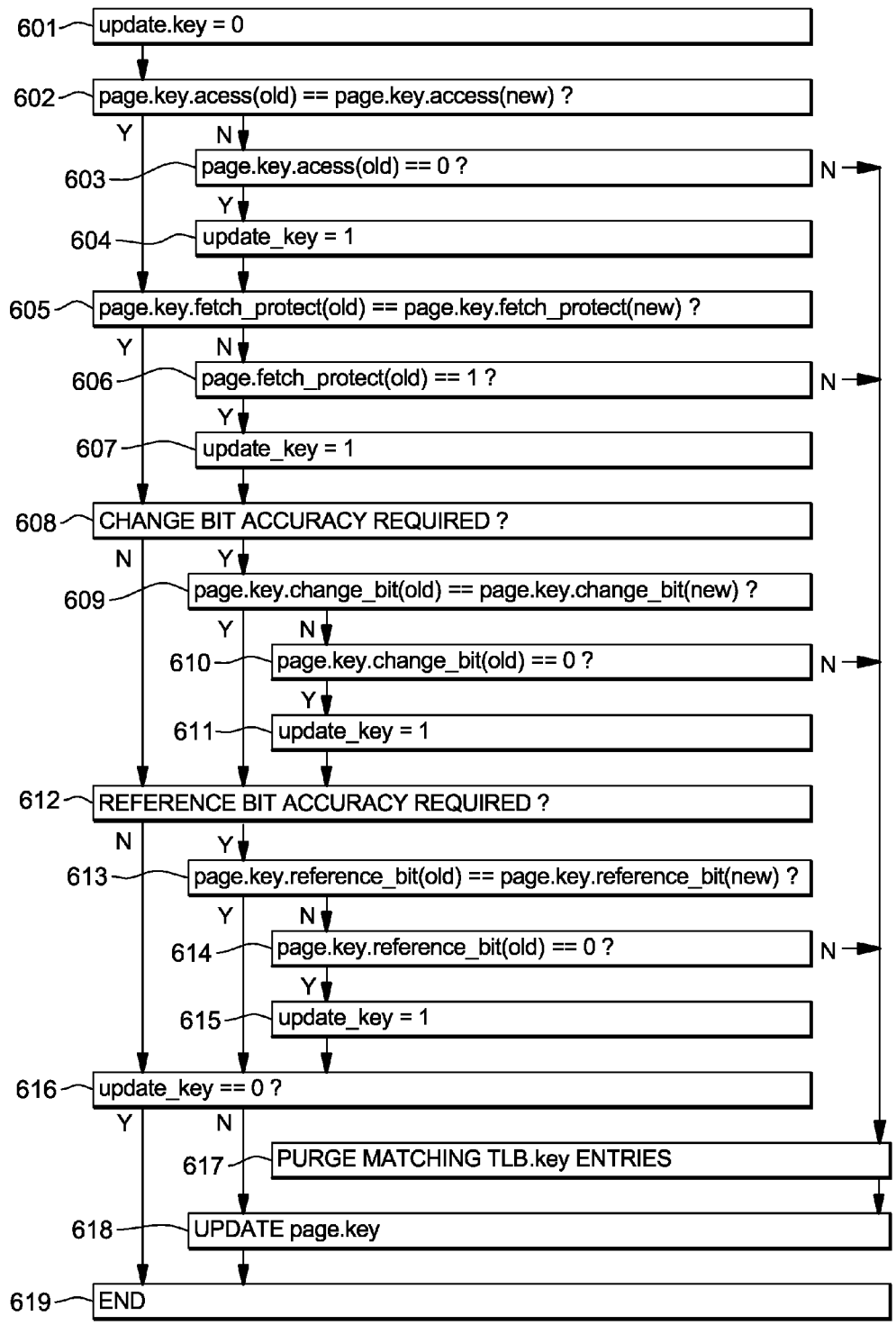
FIG. 6 depicts one embodiment of a process for determining whether to update one or more components of a previous storage key (TLB.key) in local processor cache, in accordance with an aspect of the present invention.

FIG. 6 depicts one embodiment of processing for determining whether an update storage key instruction may skip modifying the page.key and/or purging or updating of any TLB.key entries, in accordance with an aspect of the present invention.

A local variable, update_key is initialized to zero 601, and processing determines whether the access component of the old storage key matches the access component of the new storage key 602. If "yes", then the stale TLB.key will have the correct access component value, and processing continues to test the fetch protect component of the storage key 605. However, if the access component of the previous storage key mismatches that of the new storage key, processing determines whether the access component of the previous storage key has a stale value 0. If "no", then the stale key value could match and produce incorrect architectural results, so processing ends 619 after purging any matching TLB.key entries 617 and updating the page.key in central storage with the new storage key 618.

If the access component of the previous storage key mismatches the access component of the new storage key 602, and if the storage key access component has a value 0 603, then a stale key will not incorrectly match and an incorrect mismatch can be detected and corrected before presenting an architectural exception. Therefore, the update_key variable is set to 1 604 to indicate that the key in central storage must be set, and processing continues by testing the fetch protect component of the storage key 605.

If the fetch protect component of the previous storage key matches the fetch protect component of the new storage key 605, then any stale TLB.key will have the correct fetch protect component value, and processing proceeds to test the change bit component of the storage key 608. However, if the fetch protect component of the previous storage key mismatches that of the new storage key 605, and if the fetch protect component of the previous storage key is other than the stale value 1 606, then a stale key could match and produce an incorrect architectural result, so processing ends 619 after purging any matching TLB.key entries 617 and updating the page.key in central storage with the new storage key 618.

If the fetch protect component of the previous storage key mismatches that of the new storage key 605, and if the fetch protect component of the previous storage key has a stale value 1 606, then a stale key will not incorrectly match based on the fetch protect component and an incorrect mismatch can be detected and corrected before presenting an architectural exception, so the update_key variable is set to 1 607 to indicate that the key in central storage must be updated, and processing continues to test the change bit component of the storage key 608.

If change bit accuracy is not required 608, or if the change bit component of the new storage key matches that of the old storage key 609, then a stale change bit key will architecturally behave as expected for the new change bit, and processing continues by testing the reference bit component 612. However, if change bit accuracy is required 608, and if the change bit component of the new storage key mismatches the previous storage key 609, and the old storage key has a change bit component with a value 1 (and therefore, the change bit component of the new storage key is value 0) 610, a stale change bit would incorrectly indicate that the change bit component is already set, and would not inform the hardware to set the change bit component to 1 if the page were modified. Therefore, processing ends 619, after purging any matching TLB.key entries 617 and updating the page.key in central storage with the new storage key 618.

If change bit accuracy is required 608, and if the change bit component of the new storage key mismatches that of the old storage key 609, and the old storage key has a change bit component with a value 0 (and therefore, the new storage key has a change bit component with a value 1) 610, a stale change bit would (only) redundantly inform the hardware to set the change bit component to 1 if the page were modified, so the update_key variable is set to 1 611 to indicate that the key in storage must be set and processing continues to test the reference bit component 612.

If reference bit accuracy is not required 612, or if the reference bit component of the new storage key matches that of the old storage key 613, then a stale reference bit component will architecturally behave as expected for the new reference bit component, and therefore, processing continues to test the update_key variable 616. If, however, reference bit accuracy is required 612, processing determines whether the reference bit of the new storage key mismatches the reference bit of the old storage key 613, and if "no", whether the reference bit component of the previous storage key is value 0 (and therefore the value of the new storage key is a value 1) 714. If "no", then the previous storage key is a value 1 and the new storage key is a value 1, and a stale reference bit would incorrectly indicate that the reference bit component is already set, and would not inform hardware to set the page.key.reference_bit to 1 if the page were accessed, and therefore, processing ends 619, after purging any matching TLB.key entries 617 and updating the page.key in central storage with the new storage key 618.

If reference bit accuracy is required 612, and if the reference bit component of the new storage key mismatches that of the old storage key 613, and the reference bit component of the old storage key is a value 0 (and therefore, that of the new storage key is a value 1) 614, a stale reference bit would (only) redundantly inform the hardware to set the page.key.reference_bit to 1 if the page were accessed, and processing thus continues by testing the update_key variable 616.

If the update_key variable has not been set previously 616, the old key value is architecturally equivalent to the new key value, and there is no need to update the page.key or TLB.key entries. Therefore processing is complete 619. However, if the update_key variable has been set during the above-described processing, then the previous storage key value differs architecturally from the new storage key value, but stale TLB.key copies will or can be made to produce architecturally correct results, and therefore, processing exits 619 after updating the page.key in central storage with the new storage key 618.

Figure 7:
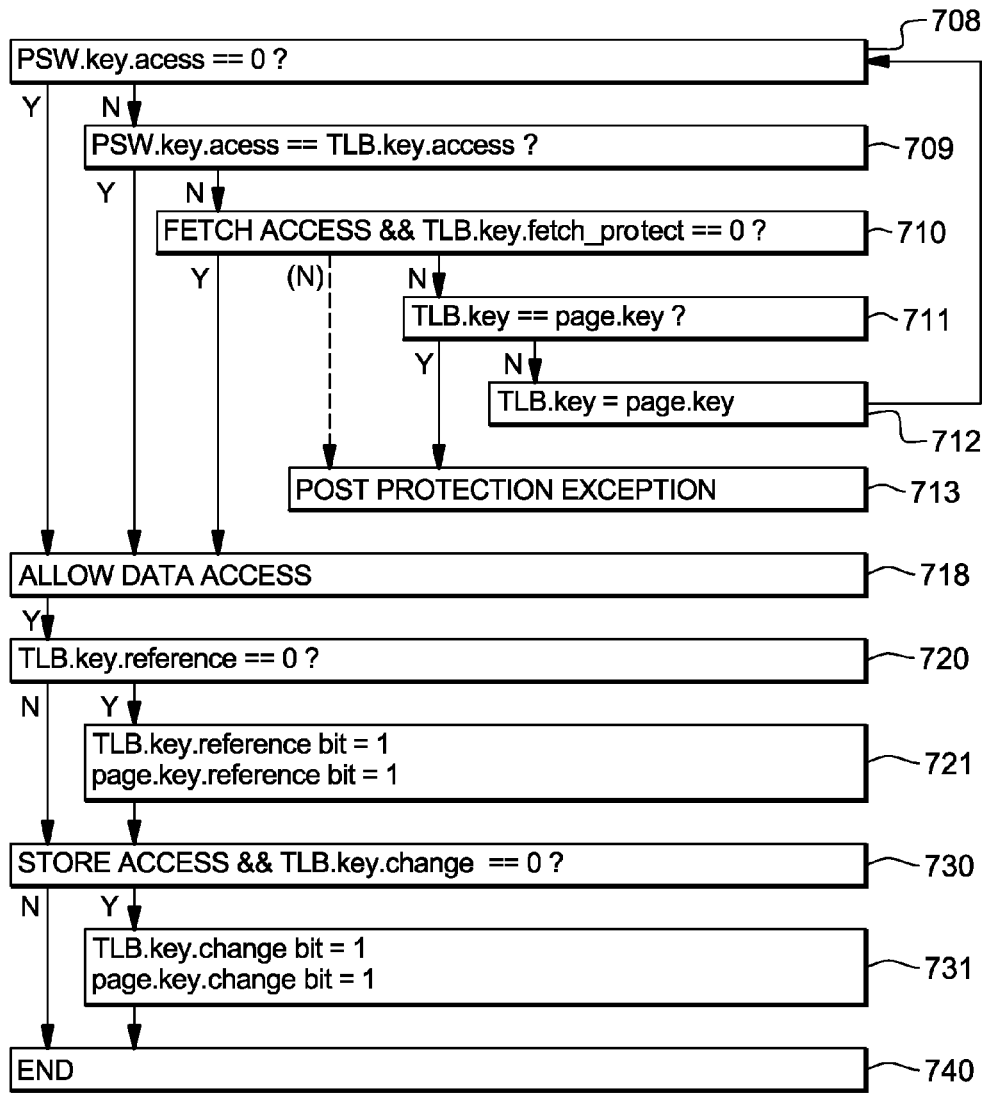
FIG. 7 depicts one embodiment of data access protect analysis for either allowing or prohibiting access to storage using a PSW.key and the components of a local processor-cached copy of the storage key (TLB.key), in accordance with an aspect of the present invention.

FIG. 7 depicts one embodiment of data access/protection processing, modified in accordance with an aspect of the present invention. This processing includes three sub-processes, referred to herein as the access protection process, the reference bit process and the change bit process. Each of these is described separately below.

The access protection process 708-718 produces correct architectural results, either via a "posting protection exception" or an "allow data access" for a TLB.key in local processor cache whose initial access component and fetch protect component values either match the current page.key values or are allowed stale values, as described above in connection with FIG. 6.

Processing begins by determining whether the PSW.key-.access has a value 0 708, and if so, the access is allowed 718 without relying on the TLB.key. If the PSW.key is determined to be other than 0 in inquiry 708, and if the TLB.key.access component matches the corresponding access component of the current page.key 709, the access is allowed 718 to occur, while a mismatch 709 results in processing proceeding to the fetch protect test 710. If the TLB.key.access field has the allowed stale value of 0, the match will fail in inquiry 709, since the PSW.key had already been determined to be other than 0 in inquiry 708 and therefore, processing proceeds to the fetch protect test 710. If the PSW.key is determined to be other than 0 in inquiry 708, and if the TLB.key.access component mismatches the corresponding access component of the current PSW.key 709, the data access may be allowed 718 if the data access is a fetch access (i.e., not a store access), and if the TLB.key.fetch.protect field is 0 710. If the TLB.key-.fetch.protect field has the allowed stale value of 1, the test inquiry 710 will fail. Previously, a failure in inquiry 710 would post a protection exception 713, shown by the dashed transition arrow. However, allowed stale values of the TLB.key.access or TLB.key.fetch.protect fields may result in a failure in inquiry 710, therefore, a failure in inquiry 710 will proceed to the TLB.key stale check 711. The TLB.key stale check 711 compares the TLB.key to the page.key value. If the values match 711, then the protection analysis was performed with a current TLB.key value and a protection exception is posted 713. However, if the values mismatch 711, then the TLB.key value was stale, and therefore, the TLB.key is refreshed with the page.key value 712 from central storage, and the protection analysis is repeated by returning to determine whether the access component or the PSW.key is a value 0 708-718.

The reference bit processing 720, 721 is unchanged from that previously performed. If the TLB.key.reference_bit is a value 0 720, then the TLB.key and page.key reference bits are set to 1. If the TLB.key.reference_bit has a stale 0 value, then the page.key.reference_bit may be redundantly set, which is architecturally invisible.

The change bit processing 730, 731 is also unchanged from that previously performed. If the TLB.key.change_bit is a value 0 730, then the TLB.key and page.key change bit components are set to value 1. If the TLB.key.change_bit has a stale 0 value, then the page.key.change_bit component may be redundantly set, which is also architecturally invisible. Processing is completed 740 after the reference bit processing and change bit processing are complete.

As noted, in accordance with another aspect of the present invention an enhancement of the above described processing is provided by a variation on the Invalidate Page Table Entry (IPTE) instruction and a variation on the Invalidate DAT Table entry (IDTE) instruction. The following discussion of FIGS. 5, 8 & 9 facilitates an explanation of these new Invalidate Page Table entry and set storage Key (IPTK) and Invalidate DAT Table entry and set storage Key (IDTK) instructions and the use of the instructions to facilitate processing within a multiprocessor computer system to minimize interprocessor communication pursuant to processing of a request update the storage key.

FIG. 5 illustrates one embodiment of a universal stale value for a storage key, where the reference bit and change bit are each zero. Advantageously, if a page.key in central storage has the universal stale value, then an update storage key request may modify the page.key to any new value and avoid purging stale cached key values as described above. The remaining columns of FIG. 5 illustrate for a Set Storage Key Extended (SSKE) instruction, conditional stale key values, which, for the given SSKE M3 bit values, will avoid a purging of stale cached key values.

Figure 8:
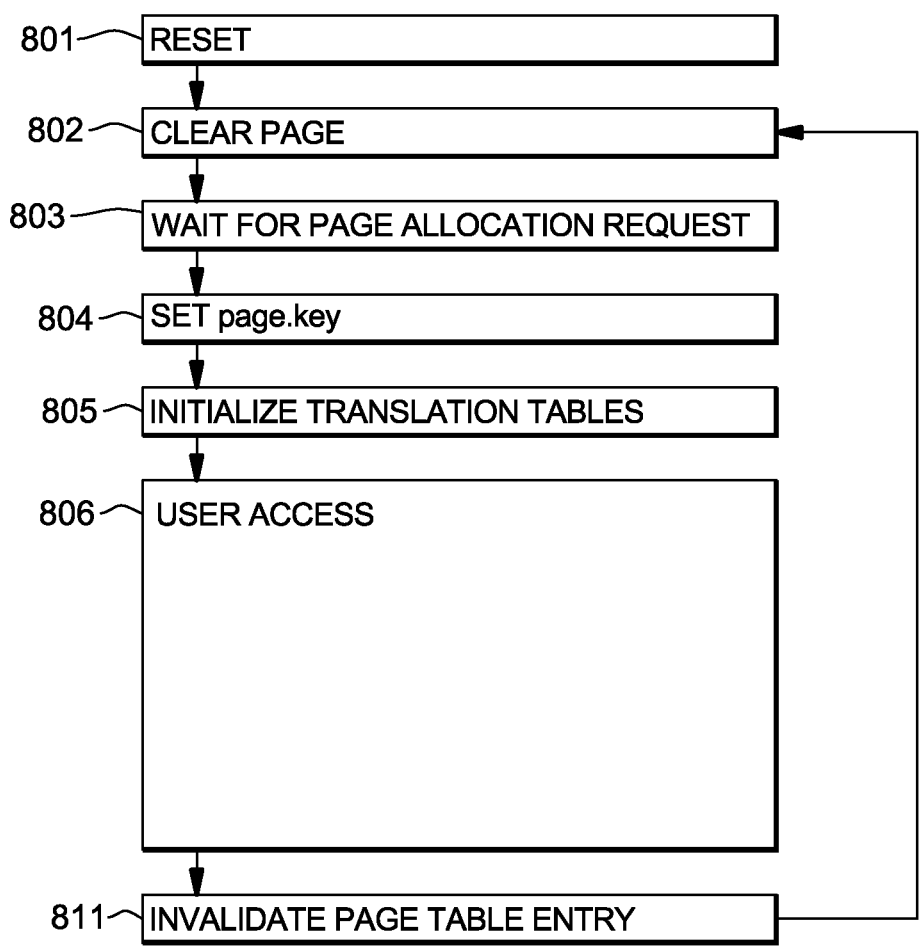
FIG. 8 depicts one embodiment of life cycle processing of a virtual page, which is being modified in accordance with one or more aspects of the present invention.

FIG. 8 illustrates one embodiment of virtual page life cycle processing. Upon reset 801, a page clear is initiated 802 and processing awaits a page allocation request for the absolute page frame 803. When a page allocation request is received, the storage key is initialized (set page.key) in central storage 804, which may include a long-latency purging of stale cached key values as described above, depending upon the previous and new storage key values. The virtual translation table entries are initialized 805 to map the virtual address to the page absolute address and the page is available for user access 806. The virtual page remains available for user access 806 until the page table entry is invalidated by an Invalidate Page Table Entry (IPTE) instruction 811. Following invalidation 811, the page may be cleared 802, and maybe made available for re-allocation 803.

The key initialization 804 may include a long latency purging of stale cache key values, because: the old and new page-.access and page.fetch_protect values may not protect stale cached values. Furthermore, if reference bit and/or change bit values are required to be accurate (e.g., SSKE M-field MR and/or MC bits are 0), then the page clearing 802 may set the reference and change bits and not allow mismatching stale reference or change bits.

Figure 9:
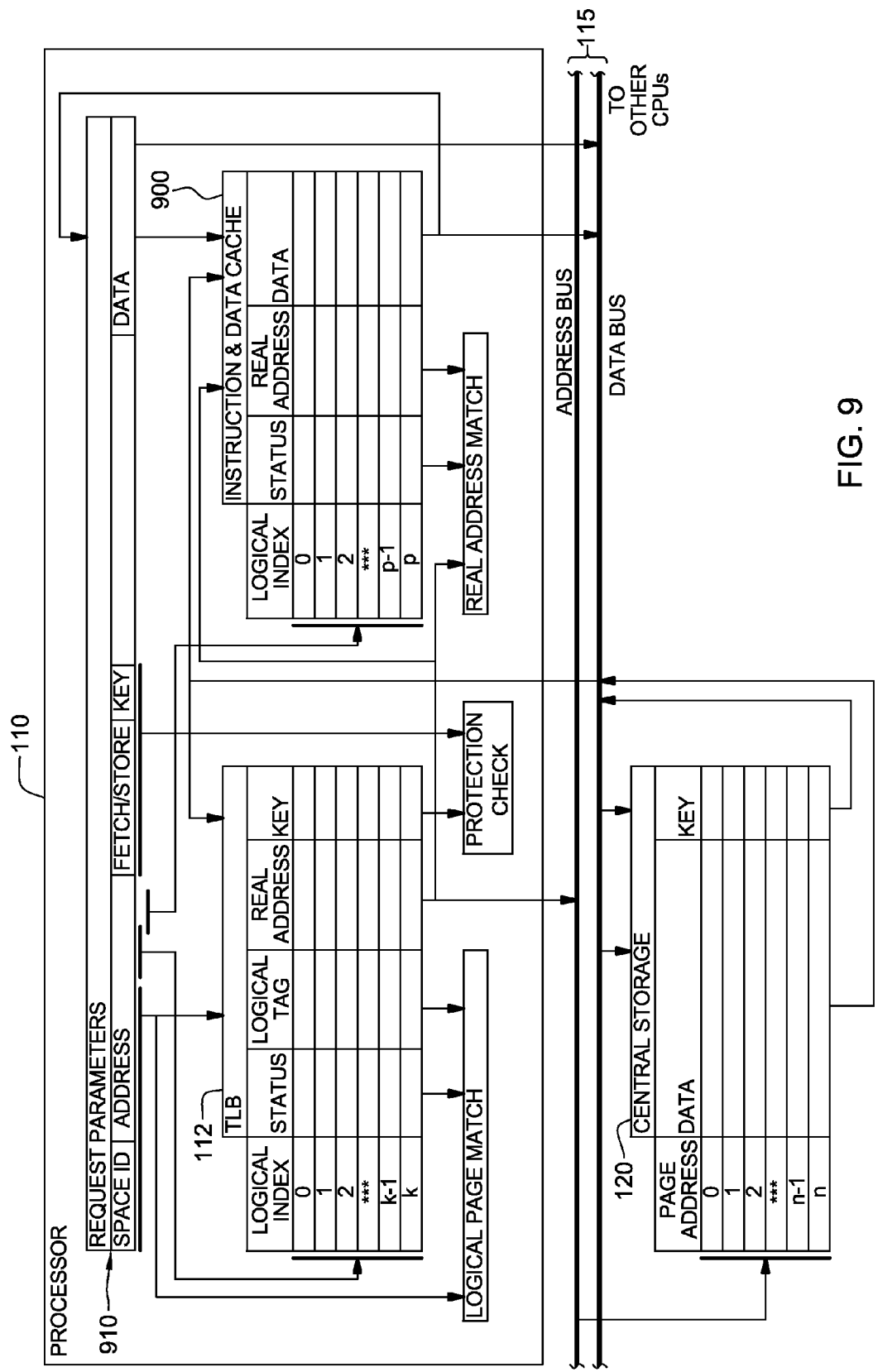
FIG. 9 is a partial block diagram of a multiprocessor computer system to incorporate and use one or more aspects of the present invention.

FIG. 9 depicts one embodiment of a multiprocessor computer system comprising a processor 110, address and data buses 115 and central storage 120, such as described above in connection with FIGS. 1 & 2. As illustrated, processor 110 includes a Translation Lookaside Buffer (TLB) 112 and an instruction & data cache 900. A fetch/store request 910 is illustrated, by way of example. The request is shown to include request parameters, a space ID and address field, a fetch/store field, a request key (e.g., a PSW.key) and a data field, into which data is stored or from which data is fetched.

A logical page match facility is employed to determine whether there is a real address match in the TLB. The protection check facility implements protect processing, such as described above in connection with FIG. 7, and the real address match facility is provided for the instruction & data cache to determine if there is an entry in that cache which corresponds to the real address at issue (identified from the translation lookaside buffer as corresponding to the request address provided in the request instruction). If so, then the data in the cache is the data that the request is directed towards, and if the request is a fetch, the data is fetched out of the cache and loaded into the data field of the request parameters. If the request is a store request, then the store data is stored into the instruction & data cache at the location of the matching address.

If there is a logical page match from the TLB, so the real address is known, but the data is not in the instruction & data cache, then the data needs to be fetched from central storage into the cache. In such a case, the real address from the TLB is sent over the address bus to central storage, and is used to read out the data and its associated key from central storage. The key is written into the TLB.key field, while the data is stored in the instruction & data cache. Thereafter, the request can access the data from the instruction & data cache. In one embodiment, all CPU storage data requests require a TLB entry to access data from the data cache or from central storage, including requests with real or absolute addresses.

When there is an update storage key request, architecturally the new storage key is stored into the key field in central storage 120. Commensurate with this, processing must ensure that any cached copies of the key in the TLBs of the other processors in the multiprocessor computer system are purged, updated, or are already of the same value so that no incorrect result will occur with a request to access data using the TLB key. During this process, the source processor executing the update storage key request instruction conventionally broadcasts a request over the address and data bus to all processors in the coherence domain indicating that it is updating the storage key at a given real address in central storage, and each processor in the system must then search its own TLBs to determine whether it has an entry that corresponds to the given real address in central storage, and if so, to purge that entry. The target processor implementing this aspect of the update storage key request invalidates matching TLB entries so that they can no longer be used. Thereafter, the target processor responds to the source processor, and at that point, the source processor executing the update storage key request can store the new storage key value in central storage.

Figure 10:
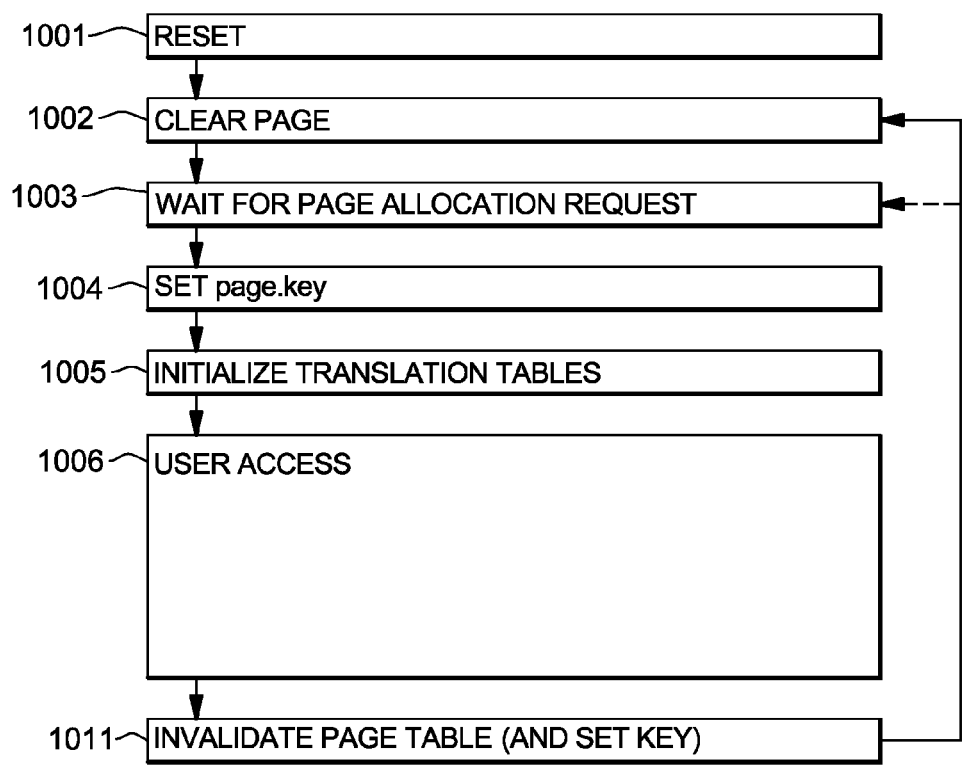
FIG. 10 depicts one embodiment of life cycle processing of a virtual page incorporating one or more aspects of the present invention.

The disadvantage of the processing described above in connection with FIGS. 8 & 9 is that there are often two rather long instruction executions, that is, the Invalidate Page Table Entry (IPTE) instruction and the update storage key instruction. Advantageously, by setting the storage key to a predefined value as part of an Invalidate Page Table entry and set storage Key (IPTK) instruction, a subsequent update storage key instruction may be facilitated by avoiding the need to purge or update cached key values, dependent on the predefined value set during the IPTK. FIG. 10 illustrates one embodiment of virtual life cycle processing implementing this aspect of the present invention.

An object of the processing depicted in FIG. 10 is to reduce processing latency by setting the storage key in central storage (i.e., the page.key) 1005 to a predefined value during an IPTE or IDTE. Advantageously, latency associated with subsequently setting the page.key is reduced if the stale cached key value is a predefined value which is, for example, an allowed stale value that allows the subsequent update storage key processing to avoid purging or updating the stale cached key values as described above.

Upon reset 1001, a page clear is initiated 1002 and processing awaits a page allocation request 1003. When a page allocation request is received 1003, the storage key is initialized 1004, with the previous reference and change bits possibly set to 1 by the page clearing or initializing 1002. The storage key is initialized (set page.key) in central storage 1004, which as noted above, may include long-latency purging of stale cached key values, depending upon the previous and new storage key values. Advantageously, described herein is an approach for increasing the probability that this initializing 1005 will avoid purging stale cached key values.

For example, purging stale cache key values may be avoided if the previous storage key equals the new storage key (described below with reference to FIG. 12), or has an allowed stale value (described below with reference to FIG. 13), or is not architecturally required to be accurate. After page key initialization 1004, the virtual translation table entries are initialized 1005 to map the virtual address to the page absolute address and the page is available for user access 1006. The virtual page remains available for user access until the page table entry is invalidated by an invalidate page table entry (IPTE) 1011, which may be enhanced with setting the page.key. In accordance with an aspect of the present invention, the conventional invalidate page table entry process is replaced by an Invalidate Page Table entry and set Key (IPTK) instruction (see FIGS. 14 & 15), which invalidates a translation table entry and purges stale TLB DAT translations, such as a IPTE, and may also clear the page.data and may set the storage key in central storage to a predefined value, such as the above described universal stale value (0x08), and may purge the cached key entries with non-allowed stale cached key values. Note that in one embodiment, key values are cached in the TLB, so that purging the TLB entry will purge both the stale DAT translation and the stale key, typically resulting in very low additional overhead for the IPTK instruction to also purge stale cached key values.

When the IPTK instruction completes, the page may be explicitly cleared 1002, if not cleared by the IPTK, else, if the page was cleared by an IPTK variant, the page may be made available for re-allocation 1003.

The initializing update storage key instruction 1004 will likely encounter the previous page.key value established by the IPTK instruction 1011 with the reference and change bits possibly set to 1 by the page clearing or initializing 1002. The IPTK page.access and page.fetch_protect values may be predefined values which comprise universal stale values, so as not to preclude stale cache key values. The reference and change bits may allow stale cached key values if: the new page.access and page.fetch_protect values are both 1 (which may be unlikely for a newly allocated page); or the reference bit and change bit values may be inaccurate (e.g., SSKE M-field MR and MC bits are 1); or the clearing or initializing of the page 1002 is done by (newly defined) instructions or instruction variants which do not set the reference or change bits. Alternatively, an IPTK-variant may clear the page in addition to setting the page table invalid and updating the storage key, which would avoid the explicit page clear 1002 and the associated setting of the page.key reference and change bits, thereby preserving the value of the reference and change bits set by the IPTK 1011 until the update storage key instruction 1004.

FIGS. 11A-11C depict one embodiment of an Invalidate Page Table entry and set Key (IPTK) instruction, and an Invalidate DAT Table entry and set Key (IDTK) instruction, in accordance with an aspect of the present invention. These figures illustrate the modifications to IPTE and IDTE instruction formats, and function to conditionally clear the page.data and conditionally set the page.key to a predefined value, in addition to the currently-architected functionality described, for example, in the above-referenced IBM z/Architecture® Principles of Operation (IBM publication SA22-7832-07). As illustrated in FIG. 11A, the IPTE and IDTE instruction format is changed to include both an R3 and M4 field. The R3 field designates a general register and bit positions 52-58 (in one embodiment) hold the key value to be stored, as shown in FIG. 11B. If the "IPTE/IDTE conditional execution facility"

is not installed, the R3 field is ignored for SSKE. The M4 field consists of 4 bits which define variations in instruction functionality, as illustrated in FIG. 11C. If the "IPTE/IDTE conditional execution facility" is not installed, the M4 field is ignored. Otherwise, bit 3 includes clearing the page.data and bit 2 indicates setting the page.key to the value of R3 bits 52-58 and purging or updating any cached key values in the coherence domain, and is subject to architectural conditions described for the SSKE. Note that the instruction formats for IPTK and IDTK illustrated in FIGS. 11A-11C are provided by way of example only. Other instruction formats could be employed by those skilled in the (art depending on the multiprocessor computer system at issue) to implement the instruction facilities described herein.

Figure 13:
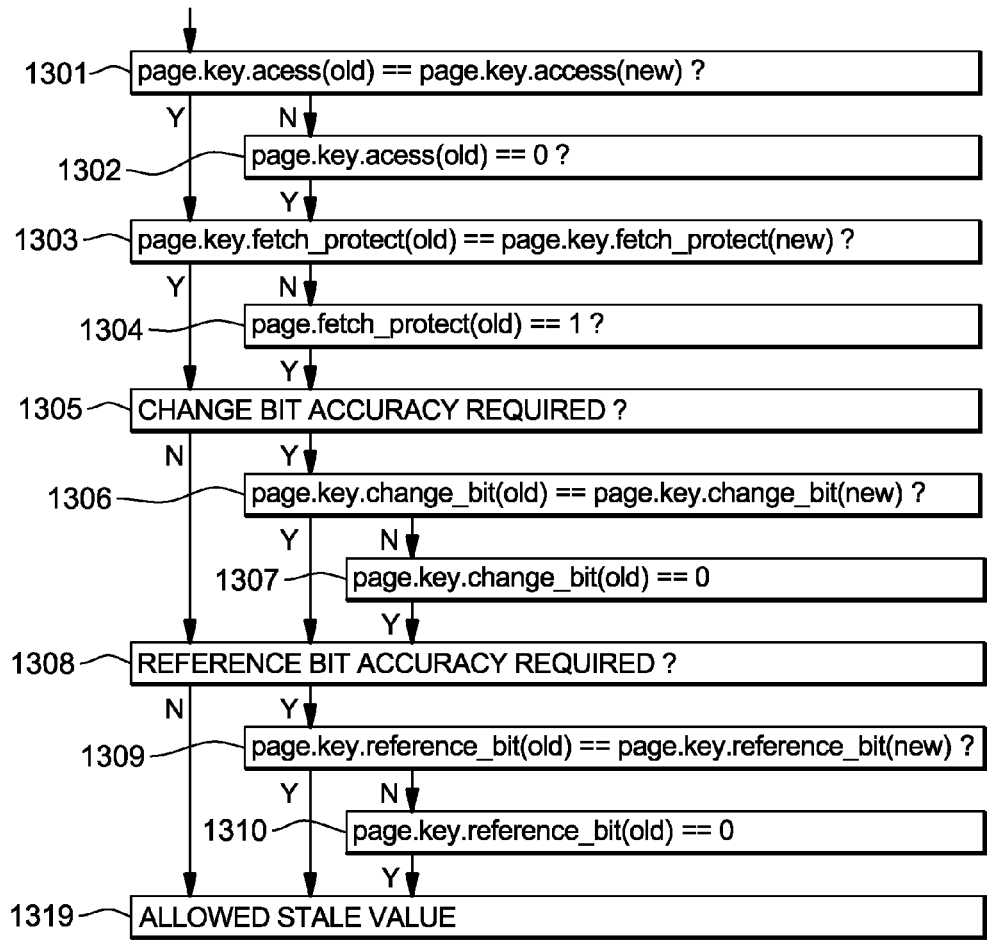
FIG. 13 depicts one embodiment of processing for determining whether a previous storage key comprises an allowed stale value, in accordance with an aspect of the present invention.

FIGS. 12 & 13 depict partial processing flow analogous to that described above in connection with FIGS. 4 & 6 respectively. In these figures, processing is illustrated for evaluating with reference to the new storage key whether the previous storage key is an "equivalent stale value" or an "allowed stale value." As used herein, the IPTK or IDTK instruction may be used to set the storage key at the matching location in central storage to any predefined value. For example, the predefined value may be set to the universal stale value described above in connection with FIG. 5, or to an allowed stale value. In addition to this, if the previous storage key is an equivalent stale value, then no further action is necessary with respect to any cached storage keys pursuant to the subject request update Referring to FIG. 12, processing compares the previous storage key (page.key (old)) to the new storage key (page.key (new)) to determine whether the previous storage key is an equivalent stale value. Specifically, the access component of the previous storage key as compared to the access component of the new storage key 1202, and if they are the same, the fetch_protect component of the previous storage key is compared to that of the new storage key 1205. Assuming that both comparisons are true, then processing determines whether change bit accuracy is required 1208, and if so, whether the change bit of the previous storage key equals the change bit of the new storage key 1209. Assuming that change bit accuracy is not required, or if it is, that the change bit components are the same, then processing determines whether reference bit accuracy is required 1212. If reference bit accuracy is required, the reference bit of the previous storage key is compared to that of the new storage key 1213, and if they are the same, or if reference bit accuracy is not required, then the previous storage key is determined to comprise an equivalent stale value 1216. This determination is used in the update storage key processing and invalidate page table entry processing of FIGS. 14 & 15, described below.

FIG. 13 illustrates processing for identifying whether the previous storage key is an allowed stale value in comparison with the new storage key. Processing initially determines whether the access component of the previous storage key is the same as the access component of the new storage key 1301. If "no", then processing determines whether the access components of the previous storage key is 0 1302. If "yes", or if the access component of the previous storage key equals that of the new storage key, then processing determines whether the fetch_protect component of the previous storage key equals that of the new storage key 1303. If "no", then a determination is made whether the fetch_protect component of the previous storage key is 1 1304. If so, or if the fetch_protect component of the previous storage key equals that of the new storage key, then processing determines whether change bit accuracy is required 1305. If "yes", then the change_bit of the previous storage key is compared to that of the new storage key to determine if they are equal 1306. If "no", then processing determines whether the change bit of the previous storage key equals 0 1307. If yes, or if the change bit of the previous storage key equals that of the new storage key, or change bit accuracy is not required, then processing determines whether reference bit accuracy is required 1308. If so, the reference bit of the previous storage key is compared to that of the new storage key to determine whether they are equal 1309. If "no", then processing determines whether the reference bit component of the previous storage key equals 0 1310, and if so, or if the reference bit of the previous storage equals that of the new storage key 1309, or if reference bit accuracy is not required 1308, then an allowed stale value is identified 1319. Characterization of the previous storage key (page.key (old)) in central storage as an allowed stale value facilitates processing described below with reference to FIGS. 14 & 15 by allowing updating of the storage key in central storage without requiring purging or updating the storage key in any local processor cache, thereby minimizing interprocessor communication pursuant to processing of a subsequent request to update a storage key.

Figure 14:
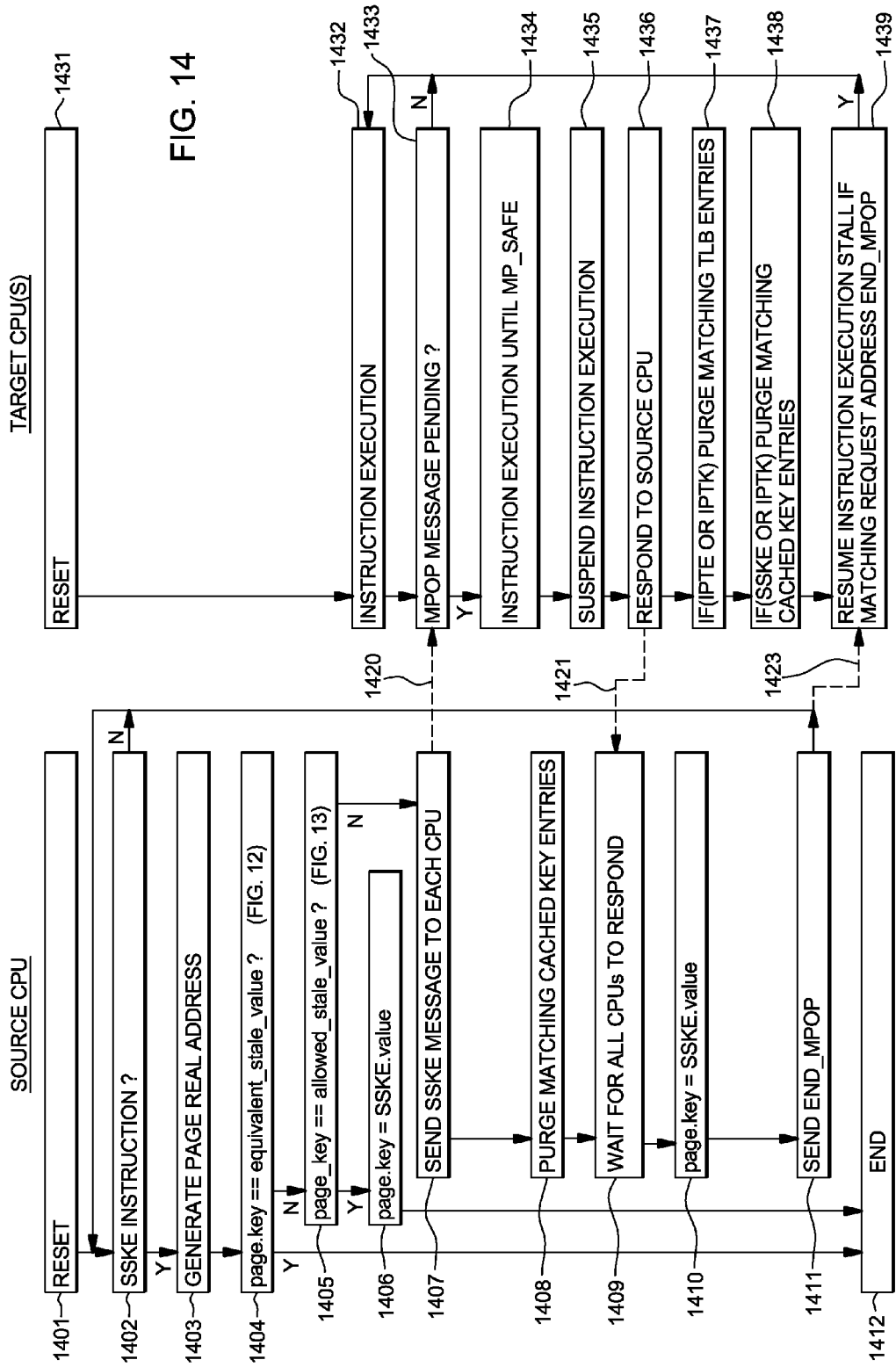
FIG. 14 depicts one embodiment of update storage key processing at a source processor and related MPOP processing at one or more target processors in the multiprocessor computer system, in accordance with an aspect of the present invention.
Figure 15:
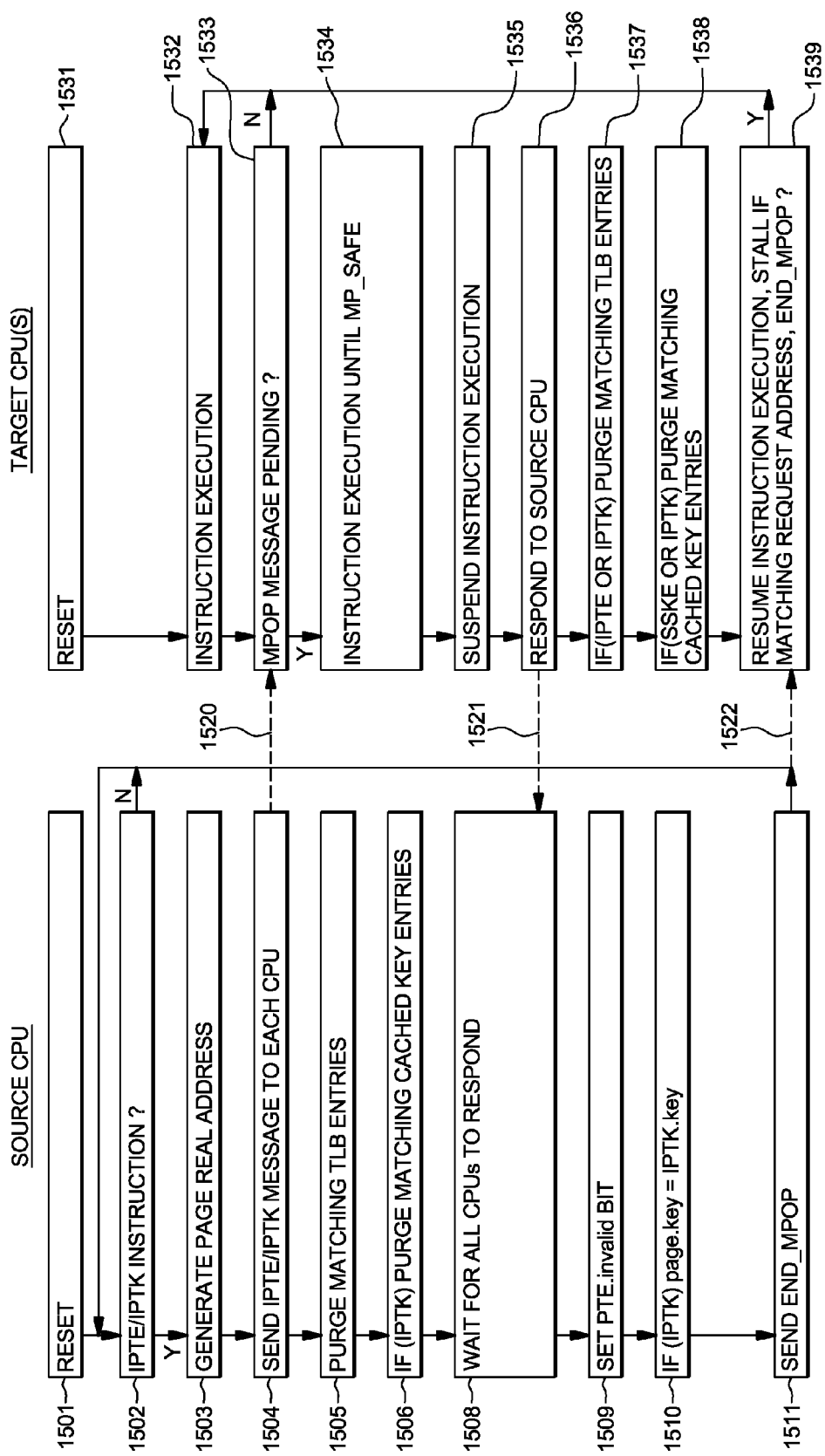
FIG. 15 depicts one embodiment of Invalidate Page Table entry and set storage Key (IPTK) processing at a source processor and related MPOP processing at one or more target processors in the multiprocessor computer system, in accordance with an aspect of the present invention.

FIGS. 14 & 15 illustrate, by way of example, SSKE instruction processing and IPTE/IPTK instruction processing, in accordance with an aspect of the present invention.

As illustrated in FIG. 14, after a source CPU has reset 1401 and encountered an SSKE instruction 1402, it may generate an SSKE_page_address 1403, which fetches the page.key value from central storage and compares it to the SSKE.key value 1404 to determine whether the previous storage key is an equivalent stale value to the new storage key. As noted above, FIG. 12 depicts one example of this processing. If the page.key in central storage is an equivalent stale value, then there is no need to update the page.key or cached key entries in local processor cache of the multiprocessor computer system since the old key and the new key produce equivalent architectural results, and processing ends 1412.

If the previous storage is not an equivalent stale value to the new storage key, then processing determines whether the previous storage key in central storage (i.e., page.key) is an allowed stale value 1405 according to the decision tree of FIG. 13. If "yes", then there is no need to update cached key entries because the stale cache key values can be made to produce correct architectural results by following the decision tree of FIG. 7, and because the SSKE.key is not an equivalent stale value, the page.key in central storage is updated to the SSKE.key value 1406, after which processing ends 1412.

If the page.key is neither an equivalent stale value 1404 nor an allowed stale value 1405, then the source CPU may send an SSKE message 1407 & 1420 to one or more target CPUs in the multiprocessor computer system. This SSKE message may include the SSKE_page_address and SSKE.key value, and is forwarded to the target CPUs in the coherence domain. The source CPU then purges any matching cache key entries 1408 for the SSKE.page and waits for all target CPUs to respond 1409 & 1421, indicating that the target CPUs have reached a state 1435 that permits the page.key to be updated. When the target CPUs have responded 1421, the source CPU may update the page.key to the SSKE.key value 1410 and may send an SSKE_end (end_MPOP) message 1411 & 1423 to the target CPUs to release the SSKE.page access restriction 1439.

At the target CPU(s), after resetting 1431, a target CPU executes instructions without SSKE page restrictions 1432, 1433. When a target CPU receives an SSKE message 1420 & 1433, it may continue with unrestricted instruction execution 1434 until it reaches an MP_safe state where it can tolerate a change to the SSKE.page key 1434. The target CPU may suspend instruction execution 1435 to preserve the safe state and acknowledge that it is prepared for the page.key update 1436 & 1421. In one embodiment, keys are cached in the TLB and a TLB entry is required for all storage requests, including those which do not rely on DAT tables, for example, a real-address or absolute-address request. Other implementations may cache keys in a separate array. In response to the SSKE message, the target processor may skip purging the matching of TLB entries 1437 for implementations which do not cache keys in the TLB, but may purge (or update to the SSKE.key value) cached key values associated with the SSKE_page_address 1438 (which, in one embodiment, would purge TLB entries which translate to the SSKE.page).

The target CPU may thereafter resume instruction executions with restricted access to the SSKE.page 1439. If the target CPU instruction stream attempts to access the SSKE.page, then instruction execution is stalled until the target CPU receives the END MPOP message from the source CPU 1423 indicating that the page.key value has been updated to the SSKE value 1439. When the target CPU receives the END MPOP message 1423, it is released from the access restrictions 1432 and it may resume unrestricted instruction execution 1432.

FIG. 15 illustrates one example of IPTE/IPTK processing in accordance with an aspect of the present invention. After rest 1501, when a source CPU encounters an IPTE or IPTK instruction 1502, it may generate an IPTE.page_address 1503, which is the absolute page address of the page to be purged. The source CPU may send an IPTE or IPTK message 1504 & 1520 to one or more target CPU(s) in the coherence domain which may include the IPTE.page_address and, for an IPTK, the IPTK.key value.

The source CPU may purge locally-cached TLB entries 1505, which map request addresses to the IPTE.page_address. For an IPTK instruction, the source CPU may also purge locally-cached key entries for the IPTE.page 1506 and wait 1508 for the target CPUs to response 1521, indicating that the target CPUs have reached a state 1535 that permits the page table entry to be invalidated and, for IPTK, for the page.key to be updated.

After the target CPUs have responded 1521 & 1508, the source CPU may set the page table entry invalid bit 1509, and for an IPTK instruction, update the page.key to the IPTK.key value 1510, after which it may send an END MPOP message 1511 & 1522 to the target CPUs to release the IPTE.page access restrictions 1539.

At the target CPU(s), after reset 1531, a target CPU may execute instructions without IPTE/IPTK.page restrictions 1532, 1533. When a target CPU receives an IPTE or IPTK message 1520 & 1533, it may continue with an unrestricted instruction execution 1534 until it reaches an MP_safe state where it can tolerate a change to the page table entry and, if an IPTK, the page key 1534. The target CPU may suspend instruction execution 1535 to preserve the MP_safe state and then respond to the source CPU 1536 & 1521 to acknowledge that it is prepared for the page table entry invalidation, and for IPTK, for the page.key update with the predefined value. In response to either an IPTE or IPTK message, a target CPU may purge TLB DAT values 1537 which map to the IPTE.page, and for IPTK, may purge (or update to the IPTE key value) cached key values associated with the IPTK.page_address 1537, as described above in connection with FIG. 14.

The target CPU may thereafter resume instruction execution with restricted access to the IPTE.page 1539. If a target CPU instruction stream attempts to access the IPTE/IPTK.page, instruction execution for that target CPU is stalled until the target CPU receives an END MPOP message from the source CPU 1523 indicating the page table entry invalid bit has been set and, for IPTK, that the page.key value has been updated to the predefined IPTK.key value. When the target CPU receives the END MPOP message 1523, it is released from access restrictions 1532 and may resume unrestricted instruction execution 1532.

As noted, in accordance with another aspect of the present invention, an enhancement of the above-described processing is provided wherein time required to clear and subsequently access cleared page data is reduced by first logically clearing a data page in central storage of the multiprocessor computer system by setting, in association with invalidate page table entry processing or set storage key processing, a page initialize bit for the data page to a clear data value without physically clearing data from the data page, and then subsequently, physically clearing data from the page in central storage responsive to a first access to the page with the page initialize bit set to the clear data value.

Conventionally, deallocation and reallocation of a virtual page frame to a new user may include the following steps:
 a) deallocate the page frame by issuing an IPTE instruction to (1) invalidate a page table entry pointing to the page frame, and (2) purge cached data derived from the page table entry;
 b) clear the page frame data from central storage;
 c) assign the page to an available page pool;
 d) select the page from the pool for allocation;
 e) set the page.key in central storage to set the access authorization to the new page frame usage;
 f) initialize a page table entry to allow access to the page frame via a request address; and
 g) and allow user access to the page frame via the request address.

As noted above, steps (a) and (e) have long latencies associated with the need to purge cached copies of address translations and protection keys, respectively. The above-described facilities provide a method for reducing latency of (e) by pre-setting the storage key during the IPTE instruction execution in step (a).

Steps (b) and (g) may also have long latencies associated with a CPU clearing and then fetching cleared lines of page data. For example, for a 4 k-byte page frame and a 256-byte data line size, clearing the page frame my consume 16 central storage line stores, while fetching the cleared lines may require 16 central storage fetches. Alternatively, if the clearing were performed by storing lines into a cache accessible to the clearing CPU, the clearing would displace 16 cache entries, and if cleared lines are first fetched by other CPUs in the system, each line access may require a relatively long-latency cache-to-cache data transfer.

Thus, disclosed herein (in one embodiment) is the concept of logically clearing a data page during step (a), that is, during execution of the relatively long-latency IPTK instruction variant described above, while subsequently physically clearing the data from the page when the data is first accessed, thereby improving performance by reducing the time required to otherwise first clear the data page and then access the cleared data from central storage.

Figure 16:
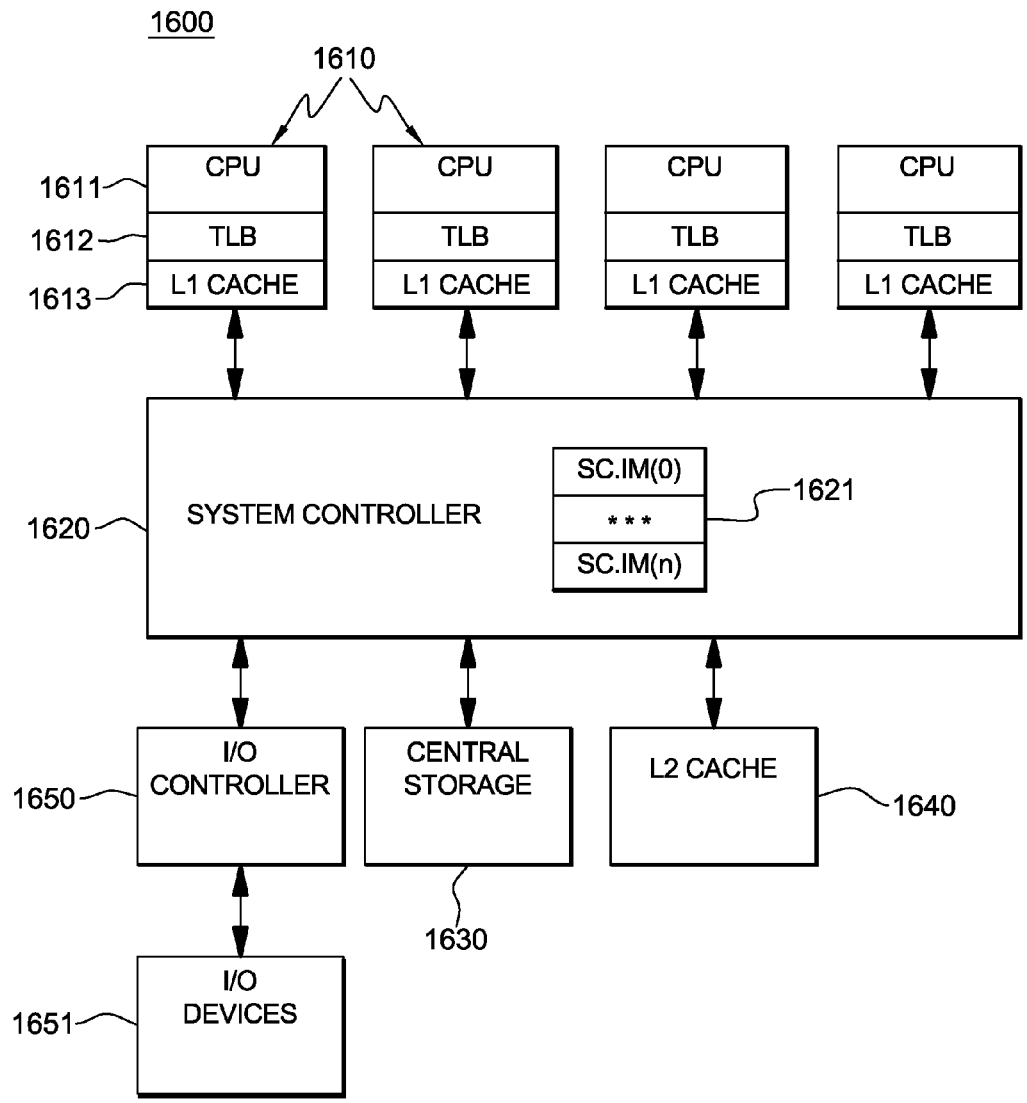
FIG. 16 is a block diagram of a further embodiment of a multiprocessor computer system to incorporate and use one or more aspects of the present invention.

FIG. 16 illustrates a further embodiment of a multiprocessor system 1600 to incorporate and use one or more aspects of the present invention. Multiprocessor system 1600 is based, for instance, on the z/Architecture referenced above in connection with FIGS. 1 & 2. As illustrated, multiprocessor system 1600 includes multiple processors 1610, each of which comprises a CPU 1611, a Translation Lookaside Buffer (TLB) 1612 and an L1 cache 1613. In this embodiment, a system controller 1620 interfaces the multiple processors 1610 with, for example, a central storage 1630 (i.e., mainstore), an L2 cache 1640 and an I/O controller 1650 which controls input/output via I/O devices 1651. In one embodiment shown, the system controller includes one or more state machines 1621, which facilitate the deferred page clear disclosed herein as described further below.

Referring back to FIGS. 9 & 11A-11C, a CPU request may include:
a) a request.space_id to identify a translation table which defines the request address space;
b) a request.address to identify the requested data location in the request address space;
c) a request.fetch/store indicator to indicate whether the request is a data fetch or store;
d) a request.key to indicate the protection access authority of the request; and
e) request.data to be loaded or stored for a fetch or store request, respectively.

A CPU TLB may include a plurality of entries which may be indexed by a subset of the request address. A TLB entry may include:
a) a TLB.status field to indicate the validity and state of the TLB entry;
b) a logical tag which may include a space.id and a subset of the request address used to create the TLB entry;
c) a central storage address translated from the translation tables indicated by the TLB.logical_tag and TLB index;
d) a key field holding a cached copy of the page.key addressed by the TLB.mainstore_address;

A CPU L1 cache may comprise a plurality of entries which may be indexed by a subset of the request address. An L1 cache entry may include:
a) an L1_cache.status field to indicate the validity and other state of the L1 cache entry, which may include a state describing store access rights and whether the data has been modified;
b) an L1 cache mainstore address field to record the mainstore address of the data; and
c) a data field with storage for a cached copy (possibly modified) of the central storage data addressed by the L1 cache mainstore address field.

A CPU request may access a TLB entry and L1 cache.

The accessed TLB status and logical tag may be compared to the request space id and address to determine whether the accessed TLB entry matches the request address space and address.

The accessed TLB key may be compared to the request key to produce a protection check result to determine whether the request has protection access authority.

The accessed TLB central storage address may be compared to the accessed L1 status and central storage address to produce an L1 cache match to determine whether the accessed L1 cache data represents the requested data and whether the L1 cache entry status permits the requested fetch/store. For example, a store request may require the L1 cache entry status to indicate that it is the only valid cached copy in the coherence domain.

Connections between the CPU and system controller may allow:
a) the TLB central storage address and the request fetch/store to be sent to the system controller;
b) request data to be sent to the system controller; and
c) the system controller to send data to the CPU, to the source TLB, L1 cache and the request payload.

Central storage may comprise n pages of user storage and q pages of system storage indexed by a mainstore (MS) address presented on a SC:MS address bus. The storage controller (SC) may present a mainstore address on the SC:MS address bus and either fetch an addressed data line via a MS:SC data bus or store an addressed line via a SC:MS data bus. In one embodiment, a 4 k-byte page size is implemented, with central storage (i.e., mainstore) pages subdivided into data lines for convenience in accessing, transferring and caching. For example, a mainstore page may be subdivided into 16 data lines of 256 bytes each. Data lines may be also subdivided into segments for convenience in transferring. In one embodiment, a data line is subdivided into 16 data segments of 16 bytes each.

A CPU may operate in system mode, which allows access to data lines in both user and system pages. In system mode, a CPU may access user mode page.key data stored in system storage pages using a mainstore address. Thus, in system mode, a CPU may access page.key values using general data-access instructions.

A CPU may also operate in user mode, which allows access to data lines in user pages and to access architecturally-defined page.keys via instructions which transform a user page address to the mainstore byte address of the associated page.key in system storage. Thus, in user mode, a CPU may access page.key values via specialized key-access instructions.

FIG. 17 illustrates one embodiment of an enhanced key format wherein a page initialize bit is added to the field of the page.key in central storage, for use as described herein. As noted above, the request key may include a 4-bit access field to indicate the request access protection privileges. The TLB.key fields may include a 4-bit access field and a fetch-protect bit to indicate the access privilege required to access the page. The TLB key may also include a reference bit and a change bit to implement the reference and change bit processing described above. In addition to the page.initialize bit disclosed herein, the page.key also includes, for example, a 4-bit access field, a fetch-protect bit, a reference bit and a change bit as described above.

Figure 18:
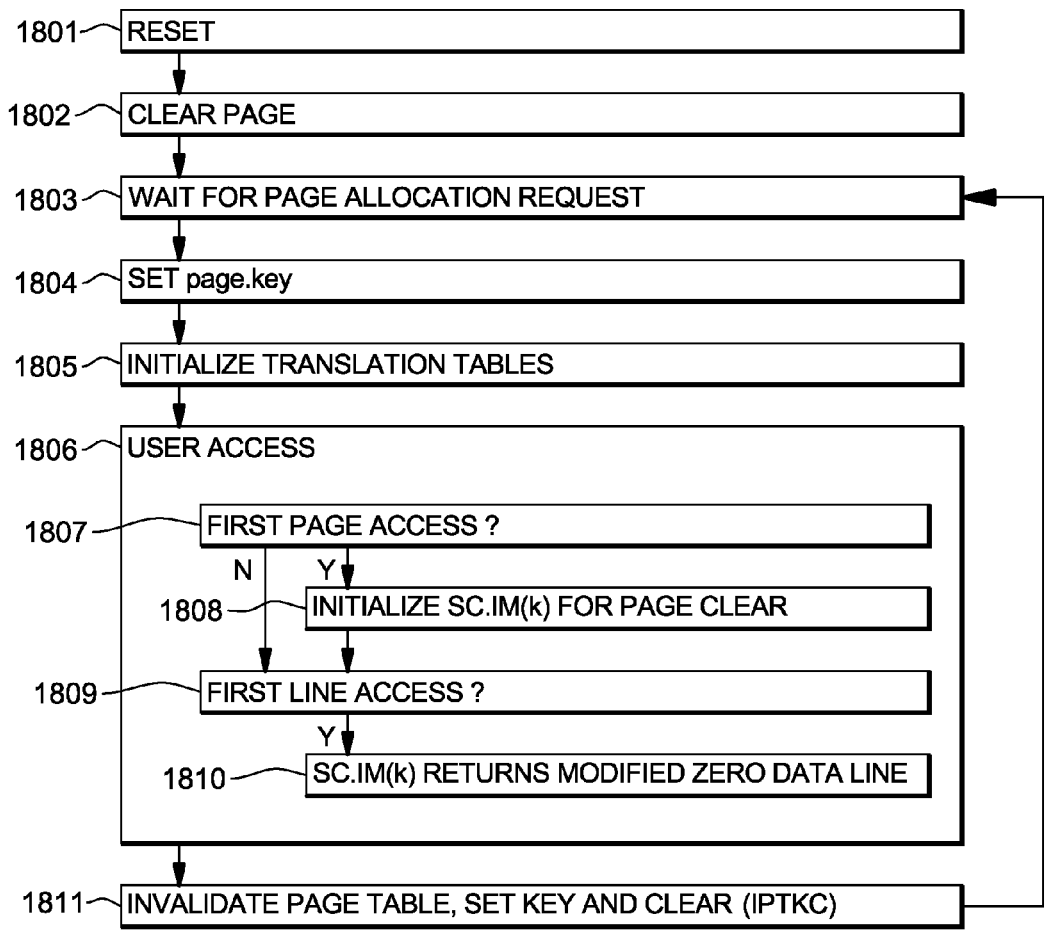
FIG. 18 is a flowchart of one embodiment of page allocation processing, in accordance with an aspect of the present invention.

FIG. 18 illustrates one embodiment of enhanced page allocation processing, in accordance with an aspect of the present invention. Upon reset 1801, a page clear is initialized 1802 and processing awaits a page allocation request for the page frame 1803. Alternatively, a page frame which has been allocated to an address space for user access 1806 may be deallocated by issuing an Invalidate Page Table, set storage Key and set Clear page bit (IDTKC) instruction 1811, which may perform the functions of the above described IPTK or IDTK instructions, and also set the page.initialize bit in the enhanced page.key illustrated in FIG. 17. As noted briefly above, setting the page.initialize bit logically indicates that the page is to be physically cleared before it is used, but the page frame data may remain uncleared in central storage until subsequently accessed. All cached copies of the key may be purged, and all TLB entries which map to the page may be purged. The page frame is subsequently placed in a pool of available page frames for allocation, until it is selected for reallocation 1803. The page frame may be assigned a page.key which may be set by an SSKE instruction 1804, that may set 7 bits of the key and preserve the page.initialize bit set by the IPTKC or IDTKC, or the SSKE may set 8 bits including the page.initialize bit to either permit or prevent clearing of the data page.

The page frame may be mapped into an address space by initializing a translation table to map a request address to the page frame address 1805, which may allow access to the page using a request address 1806. The first access to the page 1807 may allocate and initialize a system controller intervention master state machine (SC.IM (k)) 1808 to manage a returning of zeros 1810 for the first line access of each line of the logically cleared data page 1809. The first access to each line of the page is recognized by the SC.IM (k) which returns a line of clear data tagged as modified 1810. Allowing the SC.IM (k) to handle the first access to data to be cleared avoids the overhead of explicitly clearing and then fetching clear data from central storage or remote caches.

Figure 20B:
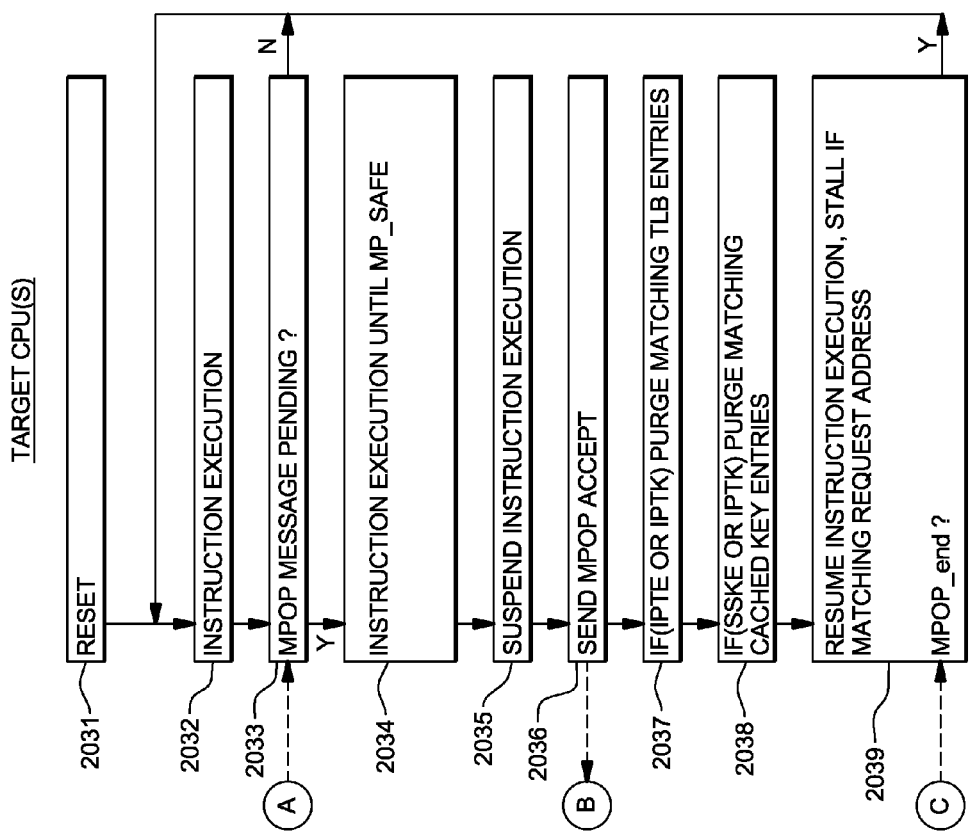

FIG. 19A depicts one embodiment of a Set Storage Key Extended (SSKE) instruction to be modified in accordance with an aspect of the present invention. As illustrated in FIG. 19A, the SSKE instruction is modified to include an M3 field to indicate whether 7 or 8 bits of the key are to be updated, as shown in FIG. 19C. As illustrated in FIG. 20B, the R1 register contents for the set storage key extended instruction is modified to include a page initialize bit (Pi), which when set in the page.key in central storage, indicates a logical clearing of the associated data page without physically clearing data from the data page, as described herein. The Pi bit in the page.key is only updated if the facility is installed and if the high-order M3 bit is 1. FIG. 19C illustrates M3 Field functionality for the SSKE instruction of FIGS. 19A & 19B.

Additionally, FIGS. 11A-11C illustrate the corresponding addition of a page initialize bit (Pi) to the R3 field of an IPTE or IDTE instruction, in accordance with an aspect of the present invention. Thus, logical clearing of a data page may be performed in association with either invalidate page table entry or set storage key processing since both instructions may be employed to set the page initialize bit to a clear data value, indicating a logical clearing of the data page without actually physically clearing data from the data page.

FIGS. 20A & 20B depict one embodiment of Invalidate Page Table entry, set storage Key and set Clear page bit (i.e., the page initialize bit) processing in accordance with an aspect of the present invention. Referring to the figures collectively, after reset 2000 a source CPU may execute instructions free from any MPOP restrictions 2001. A source CPU may encounter an IPTE or IPTK instruction 2002, and if so, generate an IPTE.page_address 2003, which may be the mainstore address of a page to be purged.

The source CPU may send an IPTE or IPTK message 2004 & 2020, which may include the IPTE.page address and, for an IPTK, the IPTK.key value, to an MPOP controller 2050-2056, which may forward the MPOP message 2021 to target CPUs in the coherence domain.

The source CPU may purge locally-cached matching TLB entries 2005 which map request addresses to the IPTE.page_address.

For an IPTK, the source CPU may also purge locally-cached key entries for the IPTE.page 2006, which in one embodiment may be cached in the TLB.

The source CPU may wait 2007 for the MPOP controller to indicate MPOP ready 2023. MPOP ready may indicate that target CPUs have reached an MPOP safe state 2035 that permits the page table entry to be invalidated and, for an IPTK, for the page.key to be updated.

Upon receiving the MPOP ready 2023 & 2007, a source CPU may set the page table entry invalid bit 2008, and for an IPTK, may update the page.key to the IPTK.key value 2008 and may send a MPOP SOURCE END message 2010 & 2024 to the MPOP controller indicating that the IPTE or IPTK instruction has architecturally completed.

If an IPTE or IPTK instruction does not indicate a deferred page clear 2011, then the source CPU may resume unrestricted instruction execution 2001. However, if an IPTE or IPTK does indicate a deferred page clear 2011, then the source CPU may continue instruction execution subject to the restriction that the CPU may not access the IPTE.page data 2012 until the MPOP controller sends MPOP END 2025, indicating that the page clear coherence request has completed. Note that the source CPU may set the page table invalid bit 2009 and set the page.key 2010 and resume restricted instruction execution 2012 in parallel with execution of the deferred page clear coherence request, which may improve the performance of the source CPU.

The MPOP controller 2050-2056 may receive an MPOP request 2050 & 2020, for example, an IPTE, or IPTK, or SSKE request from a source CPU and may pass the request to target CPUs in the coherence domain 2050 & 2021.

The MPOP controller may wait 2051 for target CPUs to respond with MPOP ACCEPT 2022 to indicate that each target CPU has reached an MPOP safe state 2035 that permits the page table entry to be invalidated and, for IPTK, for the page.key to be updated. The MPOP controller may respond to the source CPU with MPOP ACCEPT to indicate that the source CPU may proceed to update the page table entry and for IPTK, the page.key 2009.

If the MPOP included a deferred page clear request 2053, which in one embodiment consists of setting the initialize bit in the page.key in the mainstore physical key array, the MPOP controller may issue a deferred page clear coherence request 2054, which may result in deleting cached copies of IPTE.page data and may avoid updating the IPTE.page lines in mainstore.

The MPOP controller may wait 2055 until the deferred page clear coherence request has completed, indicating that cached copies of the IPTE.page have been deleted, and the source CPU responds with MPOP SOURCE END 2024 to indicate that the source CPU has complete architectural MPOP instruction execution. When both conditions are met, the MPOP controller may send MPOP END 2025 to the source and target CPUs to remove MPOP restrictions on instruction processing 2012 & 2039.

A target CPU may execute instructions without MPOP restrictions 2032 & 2033. When a target CPU receives an IPTE or IPTK message 2021 & 2033 it may continue unrestricted instruction execution 2034 until it reaches an MP-safe state 2034, where it can tolerate a change to page table entry and, for IPTK, the page key.

A target CPU may suspend instruction execution 2035 to preserve the MP-safe state, and respond to the MPOP controller 2022 to acknowledge that it is prepared for the page table entry invalidation and, for IPTK, the page.key update. In response to either an IPTE or IPTK message, a target CPU may purge TLB DAT values 2037 which map to the IPTE.page, and for IPTK or SSKE, may purge cached key values associated with the IPTK.page_address 2038. In one embodiment, the page.key values are cached in the TLB.

A target CPU may resume instruction execution with restricted access to the IPTE.page 2039 until released by receiving a MPOP END 2025, indicating that the operation is completed and unrestricted instruction 2032 may resume. Note that target CPUs may execute with restricted access to the IPTE.page 2039, while the deferred page clear coherence request is processed 2054-2055, which may improve target CPU performance.

Figure 21:
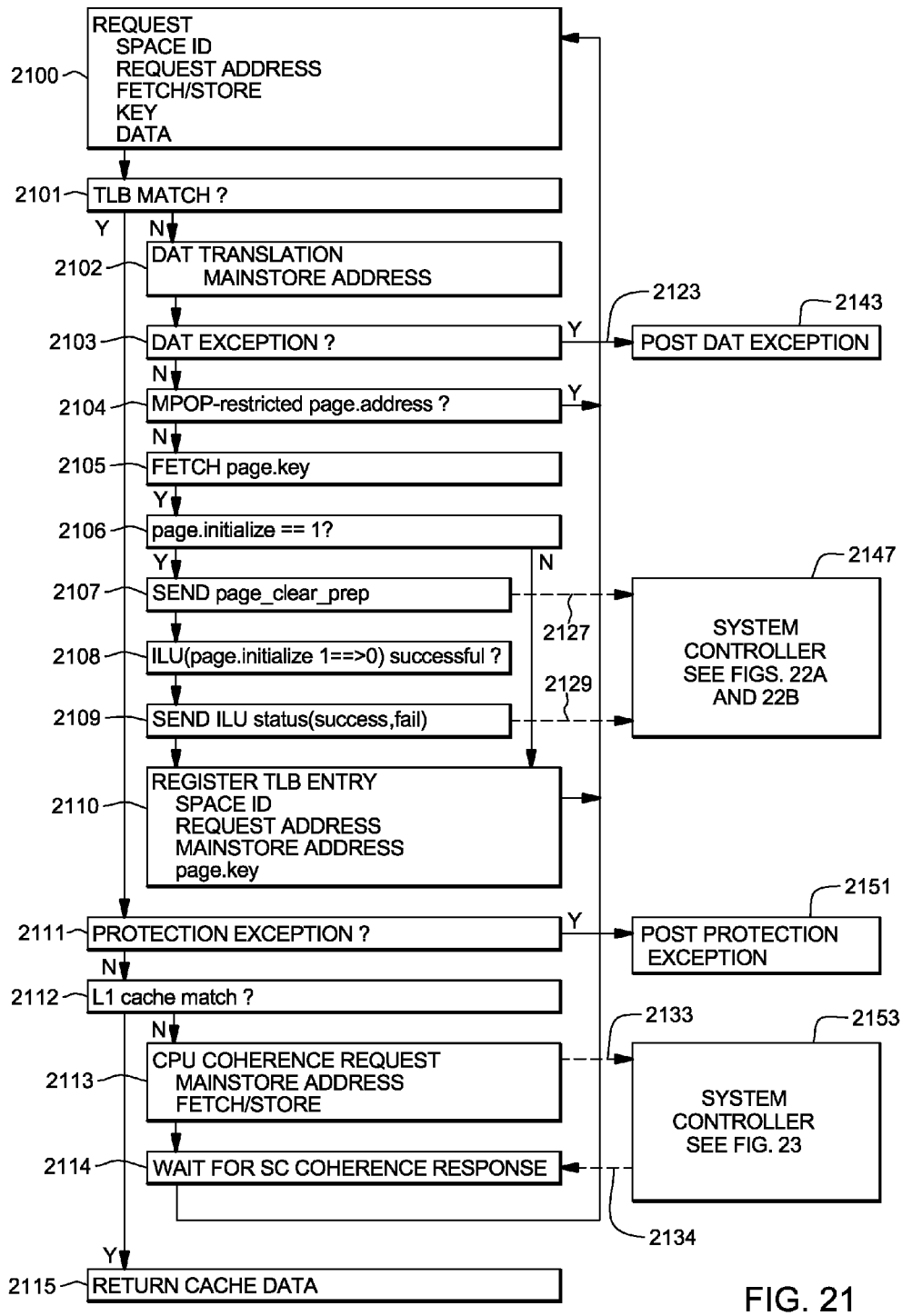
FIG. 21 depicts one embodiment of CPU request processing which may allow a page that is been initialized by an Invalidate Page Table entry and set storage Key and Clear page bit (IPTKC) instruction to return cleared data lines responsive to each first access to a respective line in the data page subsequent to setting of the page initialize bit (i.e., the clear page bit), in accordance with an aspect of the present invention.

FIG. 21 shows a CPU request processing which may allow a page which has been initialized via an IPTKC instruction to return cleared data lines for the first access to each line in the page.

A CPU presents a request, which may include a space_id, request address, fetch/store indicator, key and data 2100. If this is the first access to a page which has been initialized via an IPTKC, the TLB match test 2101 will be false, because the IPTKC purged all TLB entries resolving to the page. A translator may be invoked to translate the request address to a mainstore address, which is well-understood in the art. If the page tables for the page have been initialized, the DAT translation will not encounter DAT exceptions 2103.

If the page has MPOP access restrictions 2104, indicating that an MPOP (perhaps the IPTK that included a deferred clear to the page) is not completed, then the processing spins by regenerating the request 2100. The spinning 2104-to-2100 guarantees that (a) translation TLB registration 2110, (b) page.initialize bit testing 2106, (c) protection analysis and (d) data fetching 2113, will not be performed until any MPOP (for example, IPTE, IPTK or SSKE) has completed and (a) any page table updates 2008 and associated TLB purges 2005 & 2037, (b) any page.key updates 2009 and associated cached key purges 2009 & 2038, (c) any page clear cache coherence updates 2054 have been completed. When the page is free from MPOP access restrictions 2104, the page.key is fetched from mainstore 2105 using a system mode mainstore address.

If the page.key page initialize bit is zero, then the algorithm proceeds as in prior art to insert the translation into a TLB entry 2110. However, if the page.key page initialize bit is one, indicating that the page has yet to be cleared, the CPU sends a page_clear_prep message 2127 to the system controller 2147 so that the system controller can prepare for the page clear.

The CPU attempts to reset the page.init bit via an interlocked update (ILU) 2108. Only one CPU in the system will succeed in resetting the page.init bit. When the ILU completes, the CPU sends the ILU success or failure status 2109 & 2129 to the system controller 2147. An ILU success status indicates that the CPU was successful in resetting the page-.init bit and therefore has the responsibility to guarantee that the page will appear to be cleared for subsequent accesses.

The CPU inserts the translation into a TLB entry 2010 to allow access to the page using the request address and retries the request 2100 which will find a TLB match 2101, and proceed to the protection check 2111. The protection check 2111 may refresh a stale key before determining whether to post a protection exception as disclosed above.

A protection analysis is performed 2111 by comparing the request key to the TLB.key. A protection exception will terminate the request by posting a protection exception 2151.

If there is no protection exception 2111, then an L1 cache compare 2112 is performed.

If the L1 cache compare results in an L1 cache match, then data from the matching cache entry is returned and processing ends 2115.

If the L1 cache compare 2112 results in an L1 cache miss, then the CPU issues a CPU coherence request 2113 & 2133 to the system controller 2153.

The CPU waits for the system controller coherence response 2114. When the system controller responds 2134, the CPU retries the request 2100.

If the system controller has stored the L1 cache entry with the requested status, address and data, the recycled request will encounter a TLB match 2101, no protection exception 2111, and an L1 cache match 2112, and successfully return the data 2115.

If the system controller has not stored the L1 cache entry with the requested status, address and data prior to sending the SC coherence response 2134, the recycled request will spin through TLB match 2101, no protection exception 2111, and an L1 cache miss 2112, until the SC successfully updates the L1 cache entry. This spinning allows the coherence control to defer returning data if the coherence state of the requested line is ambiguous or in transition.

The system controller may include one or more intervention state machines each referred to herein as SC.IM.

Figure 22B:
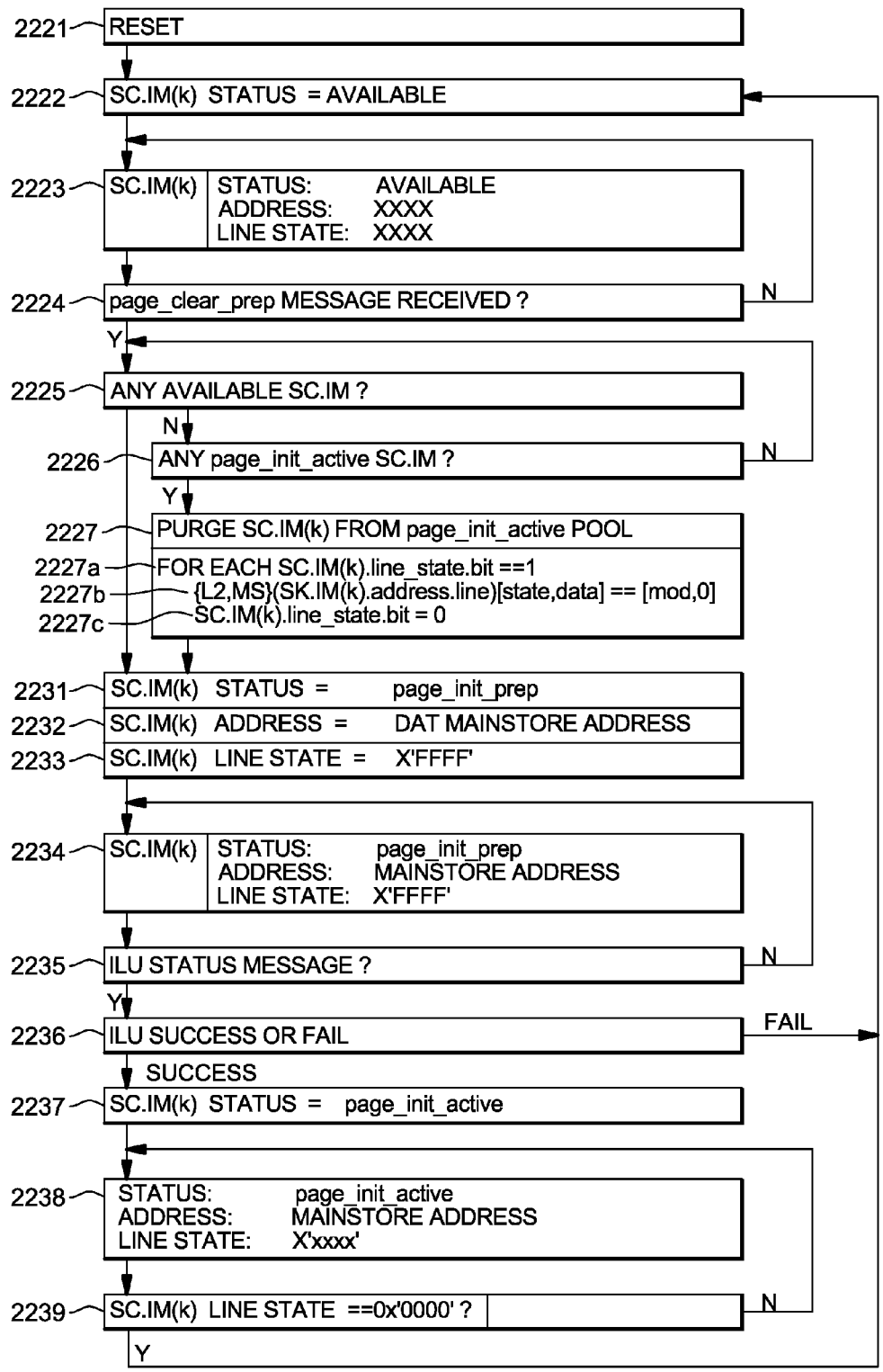
FIG. 22B depicts one embodiment of system controller state machine processing, in accordance with an aspect of the present invention

FIG. 22B shows one embodiment of a system controller intervention master state machine.

FIG. 22A shows the states for n SC.IM state machines.

Each SC.IM may include a status field to distinguish the following states:
 a) available—the SC.IM(k) is available to be allocated;
 b) page_init_prep—the SC.IM(k) has been allocated to prepare to clear a page; and
 c) page_init_active—the SC.IM(k) has been allocated to clear a page.

Each SC.IM may include a page address to identify a page to be cleared.

Each SC.IM may include a line status field to indicate the cleared status of lines in the page. In one embodiment, it includes 16 line status bits—one bit per line in the page.

FIG. 22B shows the system controller intervention master state transitions.

A reset 2221 will set all SC.IM status to the available state 2222.

When the SC receives a page_clear_prep message from a CPU 2224, the SC may allocate an available SC.IM(k) 2225, by setting the SC.IM(k) state to page_init_prep 2231, setting the SC.IM(k) page address 2232 and setting the SC.IM(k) line_state bits to 1 2233.

If there are no available SC.IMs 2225, then the SC may select an SC.IM(k) in the page_init_active state for purging 2226. For each line in the SC.IM page which has not yet been cleared as indicated by the associated line state bit still having a value of 1 2227a, the SC may clear the line 2227b, either by storing the mainstore line data to zero, or by allocating an L2 cache entry to the line and setting the L2 cache line data to zero and setting the L2 line state to modified, and then resetting the SC.IM(k) line state bit 2227c to indicate the cleared status of the line. When all lines have been cleared (indicated by line state=X '0000'), the SC may proceed to allocate the purged SC.IM(k) 2231-2233.

If there are no available or page_init_active SC.IM to select for purging 2225 & 2226, then the SC spins, waiting for one to become available which will stall the sending CPU at 2107 (FIG. 21) until an SC.IM becomes available or page_init_active.

An SC.IM(k) remains in the page_init_prep state 2234 until the CPU sends the ILU status message 2109 (FIG. 21) & 2235 (FIG. 22B).

If the CPU ILU status message indicates a fail status 2236-fail, indicating that the page.init bit was reset by some other CPU and this CPU has no responsibility for page clearing, so the SC.IM(k) status is set to available 2222.

If the CPU ILU status message indicates a success status, 2236-success, then the page.init bit was reset by this CPU and this CPU has the responsibility for page clearing, so the SC.IM(k) status is set to page_init_active 2237.

The SC.IM(k) may remain in the page_init_active state 2238 & 2239, to indicate that the first access to each line of the SC.IM page_address page should result in a cleared line of data. The first access to each line of the page may reset the associated SC.IM(k) line state bit to indicate that the initial access has returned zero data and that subsequent accesses to the line should be treated normally by the system coherence algorithms.

When every line in the page has been accessed, the SC.IM (k) line state will be X'0000' and the SC.IM(k) status may be set to available 2239.

Figure 23:
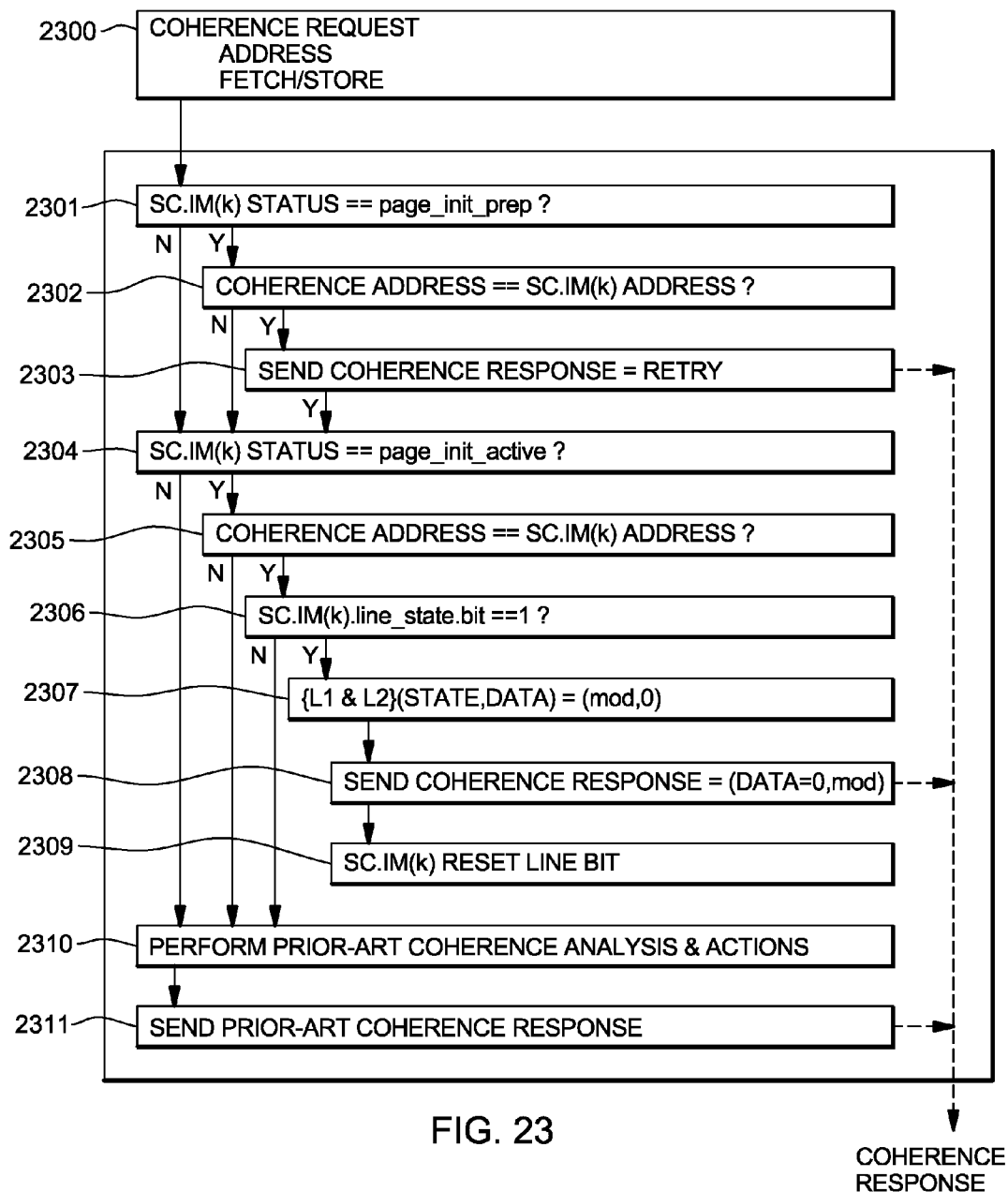
FIG. 23 is a flowchart of one embodiment of storage controller coherence processing, in accordance with an aspect of the present invention.

FIG. 23 shows one embodiment of the SC coherence flow. An SC may receive a coherence request 2300, from a CPU 2113 & 2133 (FIG. 21), or IOPP which may include an address and a fetch or store status 2300.

If the coherence address matches any SC.IM page_init_prep address, 2301 & 2302, the SC sends a coherence retry response without updating the L1 or L2 cache. The sender of the coherence request may retry the request until the CPU resolves the interlocked update to the page initialize bit 2109 (FIG. 21) and sends the ILU resolution message 2129 which will cause the SC.IM(k) to exit the page_init_prep state.

If the coherence address matches any SC.IM page_init_active address 2304 & 2305 and if the SC.IM(k) associated line_state bit is set 2306, indicating that this is the first access to the line since the page.init bit was set, the SC may update the L2 cache and the sending CPU L1 cache with a line of zero data, marking the L2 cache line status to the modified state 2308 to indicate that the L2 line data is to be used to source future coherence requests for the line until the line is updated in mainstore.

The SC may send a (DATA=0, mod) coherence response 2308 which may cause the sending CPU to retry as shown in FIG. 21, the request 2114, which should succeed by encountering TLB match 2101, no protection exception 2111, and an L1 cache match 2112 on the newly-inserted 2307 L1 cache line of cleared data.

If the coherence address does not match any SC.IM page_init_prep address 2301 or 2302 or any page_init_active address with an associated line_state bit equal to 1, 2304 or 2305 or 2306, then the SC may perform well-known prior art coherence analysis and actions, for example, searching L1 & L2 caches for modified or unmodified copies of the requested line, modifying the state of L1 & L2 cache entries, and fetching a current copy of the line from mainstore or L1 or L2 caches, and storing the current copy in L1 and L2 caches.

The SC may send a coherence response to the sending CPU to indicate that the coherence analysis and actions are complete 2311 so that the requesting CPU may retry the request 2114 (see FIG. 21).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), a optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 24:
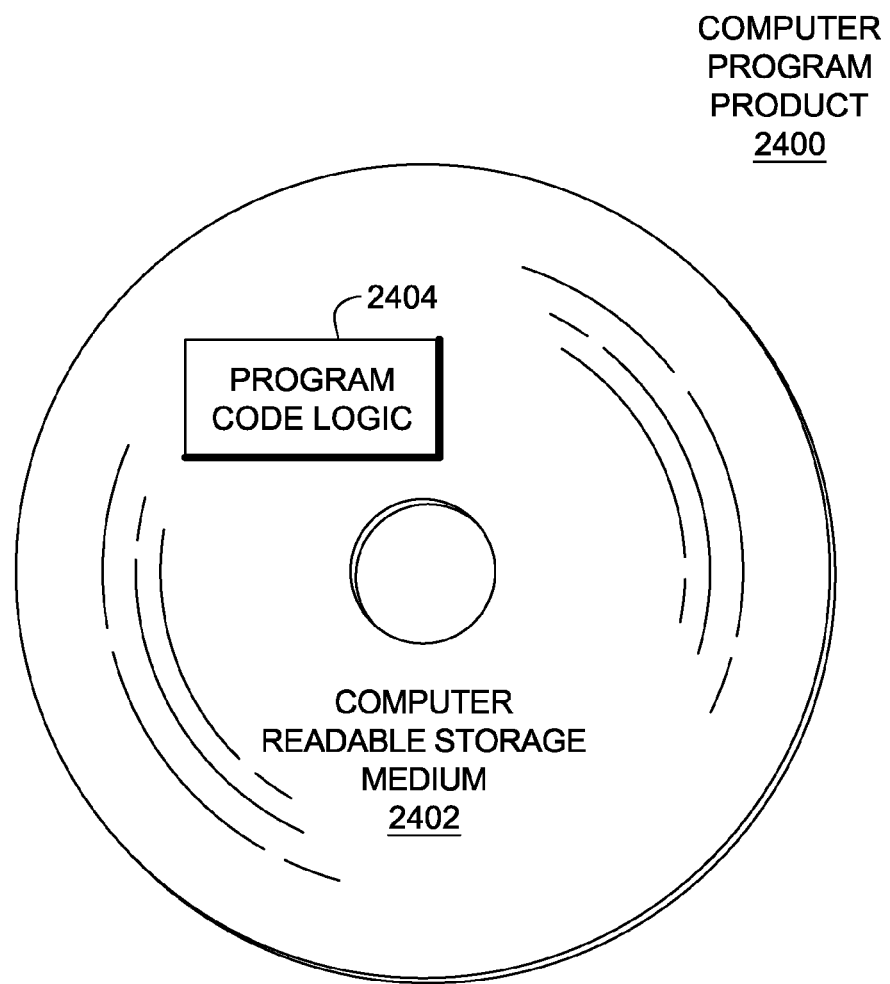
FIG. 24 depicts one embodiment of a computer program product incorporating one or more aspects of the present invention.

Referring to FIG. 24, in one example, a computer program product 2400 includes, for instance, one or more computer readable storage media 2402 to store computer readable program code means or logic 2404 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

A data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 25:
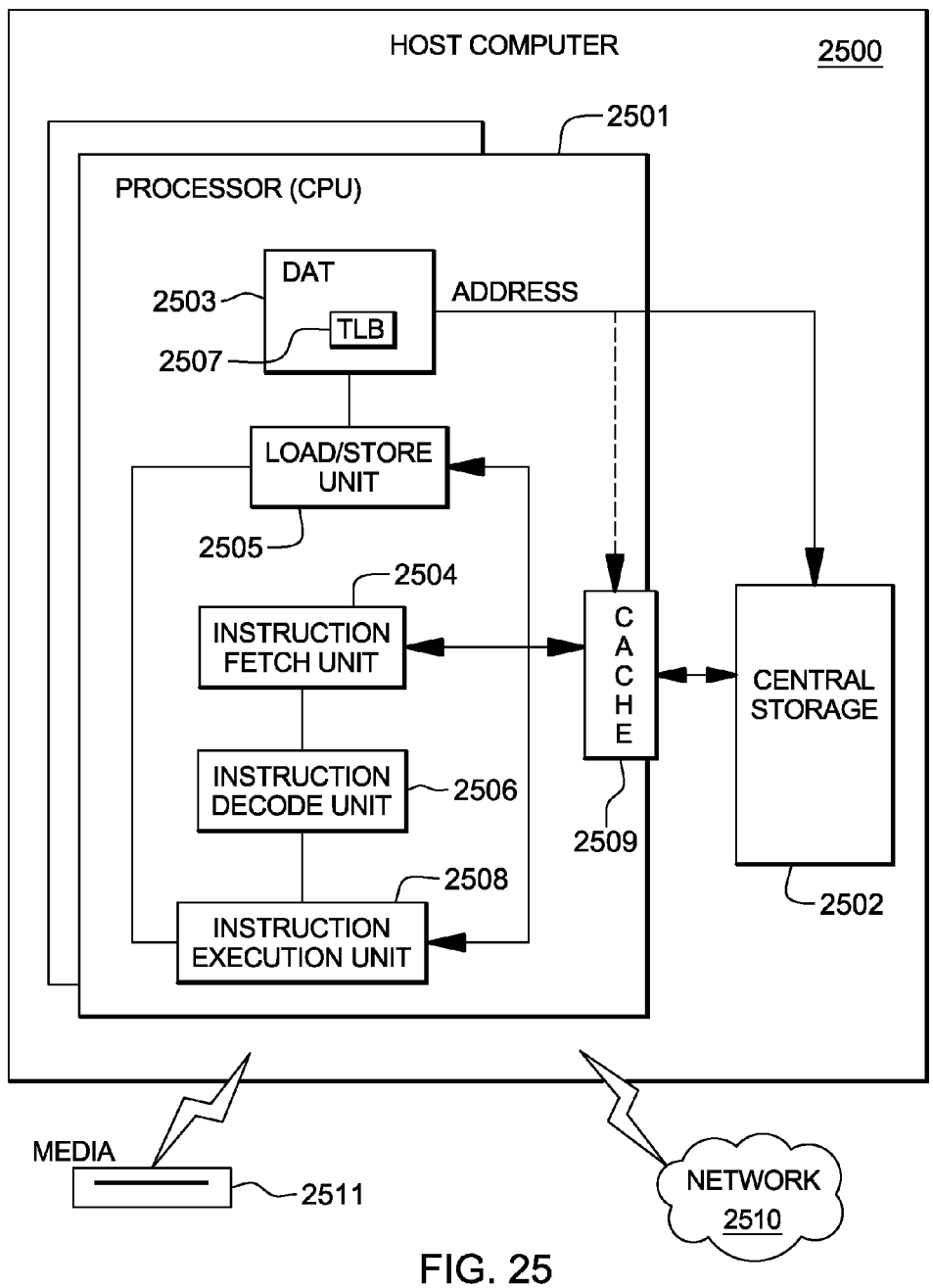
FIG. 25 depicts one embodiment of a host computer system to incorporate and use one or more aspects of the present invention.

Referring to FIG. 25, representative components of a Host Computer system 2500 to implement one or more aspects of the present invention are portrayed. The representative host computer 2500 comprises one or more CPUs 2501 in communication with computer memory (i.e., central storage) 2502, as well as I/O interfaces to storage media devices 2511 and networks 2510 for communicating with other computers or SANs and the like. The CPU 2501 is compliant with an architecture having an architected instruction set and architected functionality. The CPU 2501 may have dynamic address translation (DAT) 2503 for transforming program addresses (virtual addresses) into real addresses of memory. A DAT typically includes a translation lookaside buffer (TLB) 2507 for caching translations so that later accesses to the block of computer memory 2502 do not require the delay of address translation. Typically, a cache 2509 is employed between computer memory 2502 and the processor 2501. The cache 2509 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 2502 by an instruction fetch unit 2504 via a cache 2509. The instruction is decoded in an instruction decode unit 2506 and dispatched (with other instructions in some embodiments) to instruction execution unit or units 2508. Typically several execution units 2508 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 2502, a load/store unit 2505 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs must be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address.

Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, a group of bytes in storage is addressed by the leftmost byte of the group. The number of bytes in the group is either implied or explicitly specified by the operation to be performed. When used in a CPU operation, a group of bytes is called a field. Within each group of bytes, bits are numbered in a left-to-right sequence. The leftmost bits are sometimes referred to as the "high-order" bits and the rightmost bits as the "low-order" bits. Bit numbers are not storage addresses, however. Only bytes can be addressed. To operate on individual bits of a byte in storage, it is necessary to access the entire byte. The bits in a byte are numbered 0 through 7, from left to right. The bits in an address may be numbered 8-31 or 40-63 for 24-bit addresses or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte. When information is placed in storage, the contents of only those byte locations are replaced that are included in the designated field, even though the width of the physical path to storage may be greater than the length of the field being stored.

Certain units of information must be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions must be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with the present invention). Referring to FIG. 25, software program code which embodies the present invention is typically accessed by the processor 2501 of the host system 2500 from long-term storage media devices 2511, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from the computer memory 2502 or storage of one computer system over a network 2510 to other computer systems for use by users of such other systems.

The software program code includes an operating system which controls the function and interaction of the various computer components and one or more application programs. Program code is normally paged from storage media device 2511 to the relatively higher-speed computer storage 2502 where it is available for processing by the processor 2501. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 26:
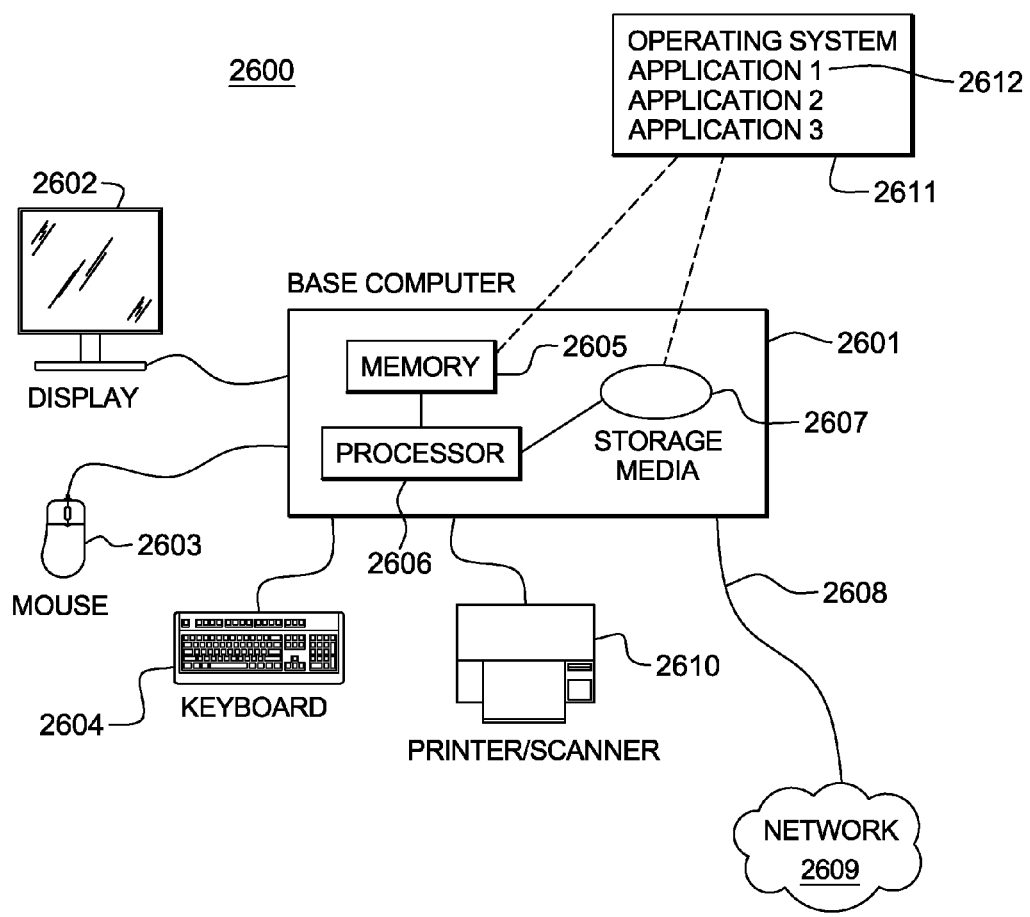
FIG. 26 depicts a further example of a computer system to incorporate and use or more aspects of the present invention.

FIG. 26 illustrates a representative workstation or server hardware system in which the present invention may be practiced. The system 2600 of FIG. 26 comprises a representative base computer system 2601, such as a personal computer, a workstation or a server, including optional peripheral devices. The base computer system 2601 includes one or more processors 2606 and a bus employed to connect and enable communication between the processor(s) 2606 and the other components of the system 2601 in accordance with known techniques. The bus connects the processor 2606 to memory 2605 and long-term storage 2607 which can include a hard drive (including any of magnetic media, CD, DVD and Flash Memory for example) or a tape drive for example. The system 2601 might also include a user interface adapter, which connects the microprocessor 2606 via the bus to one or more interface devices, such as a keyboard 2604, a mouse 2603, a printer/scanner 2610 and/or other interface devices, which can be any user interface device, such as a touch sensitive screen, digitized entry pad, etc. The bus also connects a display device 2602, such as an LCD screen or monitor, to the microprocessor 2606 via a display adapter.

The system 2601 may communicate with other computers or networks of computers by way of a network adapter capable of communicating 2608 with a network 2609. Example network adapters are communications channels, token ring, Ethernet or modems. Alternatively, the system 2601 may communicate using a wireless interface, such as a CDPD (cellular digital packet data) card. The system 2601 may be associated with such other computers in a Local Area Network (LAN) or a Wide Area Network (WAN), or the system 2601 can be a client in a client/server arrangement with another computer, etc. All of these configurations, as well as the appropriate communications hardware and software, are known in the art.

Figure 27:
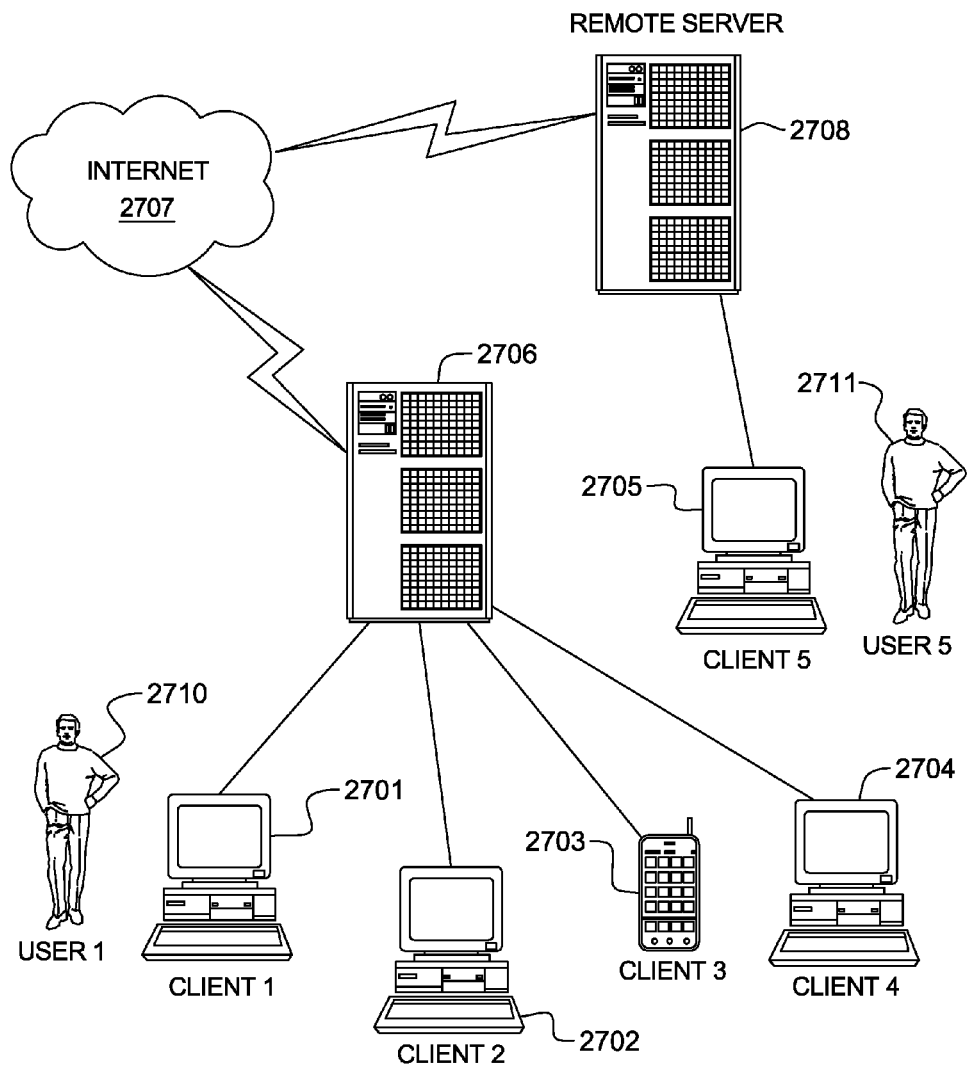
FIG. 27 depicts another example of a computer system comprising a computer network, to incorporate and use one or more aspects of the present invention.

FIG. 27 illustrates a data processing network 2700 in which the present invention may be practiced. The data processing network 2700 may include a plurality of individual networks, such as a wireless network and a wired network, each of which may include a plurality of individual workstations 2701, 2702, 2703, 2704. Additionally, as those skilled in the art will appreciate, one or more LANs may be included, where a LAN may comprise a plurality of intelligent workstations coupled to a host processor.

Still referring to FIG. 27, the networks may also include mainframe computers or servers, such as a gateway computer (client server 2706) or application server (remote server 2708 which may access a data repository and may also be accessed directly from a workstation 2705). A gateway computer 2706 serves as a point of entry into each individual network. A gateway is needed when connecting one networking protocol to another. The gateway 2706 may be preferably coupled to another network (the Internet 2707 for example) by means of a communications link. The gateway 2706 may also be directly coupled to one or more workstations 2701, 2702, 2703, 2704 using a communications link. The gateway computer may be implemented utilizing an IBM eServer™ zSeries® z9® Server available from IBM Corp.

Referring concurrently to FIG. 26 and FIG. 27, software programming code which may embody the present invention may be accessed by the processor 2606 of the system 2601 from long-term storage media 2607, such as a CD-ROM drive or hard drive. The software programming code may be embodied on any of a variety of known media for use with a data processing system, such as a diskette, hard drive, or CD-ROM. The code may be distributed on such media, or may be distributed to users 2710, 2711 from the memory or storage of one computer system over a network to other computer systems for use by users of such other systems.

Alternatively, the programming code may be embodied in the memory 2605, and accessed by the processor 2606 using the processor bus. Such programming code includes an operating system which controls the function and interaction of the various computer components and one or more application programs 2612. Program code is normally paged from storage media 2607 to high-speed memory 2605 where it is available for processing by the processor 2606. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 28:
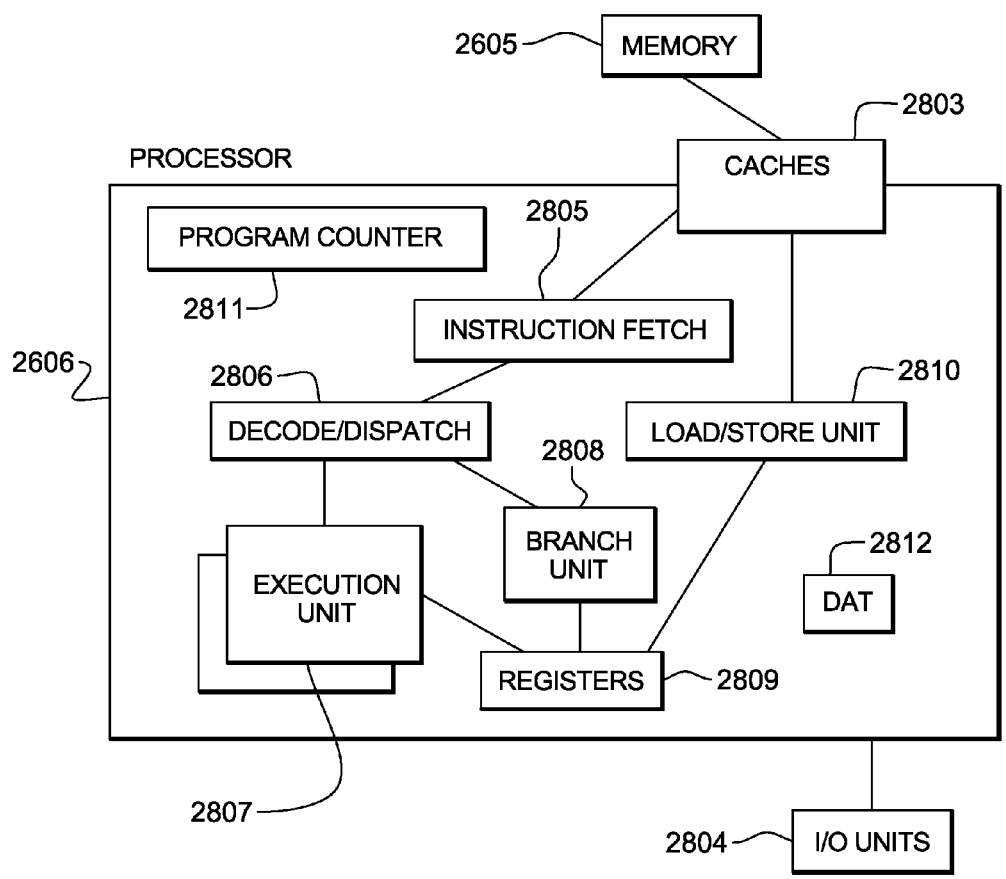
FIG. 28 depicts one embodiment of various elements of a computer system to incorporate and use one or more aspects of the present invention.

Referring to FIG. 28, an exemplary processor embodiment is depicted for processor 2606. Typically one or more levels of cache 2803 are employed to buffer memory blocks in order to improve processor performance. The cache 2803 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 2605 of a processor system is often referred to as a cache. In a processor system having 4 levels of cache 2803, main storage 2605 is sometimes referred to as the level 5 (L5) cache since it is typically faster and only holds a portion of the non-volatile storage (DASD, Tape etc) that is available to a computer system. Main storage 2605 "caches" pages of data paged in and out of the main storage 2605 by the Operating system.

A program counter (instruction counter) 2811 keeps track of the address of the current instruction to be executed. A program counter in a z/Architecture® processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture® are CISC instructions having a length of 2, 4 or 6 bytes. The Program counter 2811 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 2811.

Typically an instruction fetch unit 2805 is employed to fetch instructions on behalf of the processor 2606. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 2606. In an embodiment, the fetched instruction(s) are passed to a dispatch unit 2806 of the fetch unit. The dispatch unit decodes the instruction(s) and forwards information about the decoded instruction(s) to appropriate units 2807, 2808, 2810. An execution unit 2807 will typically receive information about decoded arithmetic instructions from the instruction fetch unit 2805 and will perform arithmetic operations on operands according to the opcode of the instruction. Operands are provided to the execution unit 2807 preferably either from memory 2605, architected registers 2809 or from an immediate field of the instruction being executed. Results of the execution, when stored, are stored either in memory 2605, registers 2809 or in other machine hardware (such as control registers, PSW registers and the like).

Figure 29A:
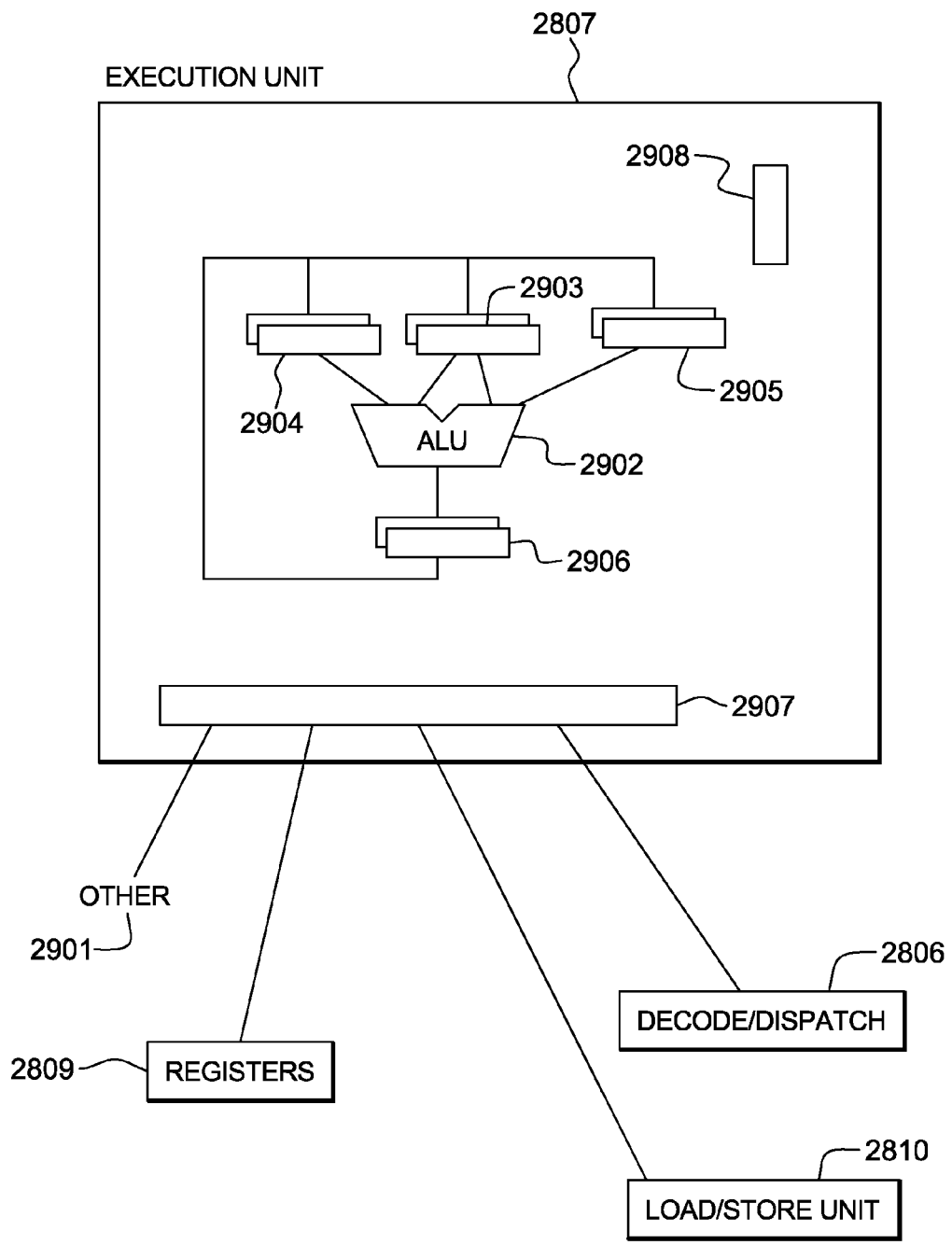
FIG. 29A depicts one embodiment of the execution unit of the computer system of FIG. 28, to incorporate and use one or more aspects of the present invention.

A processor 2606 typically has one or more execution units 2807, 2808, 2810 for executing the function of the instruction. Referring to FIG. 29A, an execution unit 2807 may communicate with architected general registers 2809, a decode/dispatch unit 2806, a load store unit 2810, and other 2901 processor units by way of interfacing logic 2907. An execution unit 2807 may employ several register circuits 2903, 2904, 2905 to hold information that the arithmetic logic unit (ALU) 2902 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 2908 including condition codes and recovery support logic for example. Typically the result of an ALU operation is held in an output register circuit 2906 which can forward the result to a variety of other processing functions. There are many arrangements of processor units, the present description is only intended to provide a representative understanding of one embodiment.

An ADD instruction for example would be executed in an execution unit 2807 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 2807 on operands found in two registers 2809 identified by register fields of the instruction.

The execution unit 2807 performs the arithmetic addition on two operands and stores the result in a third operand where the third operand may be a third register or one of the two source registers. The execution unit preferably utilizes an Arithmetic Logic Unit (ALU) 2902 that is capable of performing a variety of logical functions such as Shift, Rotate, And, Or and XOR as well as a variety of algebraic functions including any of add, subtract, multiply, divide. Some ALUs 2902 are designed for scalar operations and some for floating point. Data may be Big Endian (where the least significant byte is at the highest byte address) or Little Endian (where the least significant byte is at the lowest byte address) depending on architecture. The IBM z/Architecture® is Big Endian. Signed fields may be sign and magnitude, 1's complement or 2's complement depending on architecture. A 2's complement number is advantageous in that the ALU does not need to design a subtract capability since either a negative value or a positive value in 2's complement requires only and addition within the ALU. Numbers are commonly described in shorthand, where a 12 bit field defines an address of a 4,096 byte block and is commonly described as a 4 Kbyte (Kilo-byte) block for example.

Figure 29B:
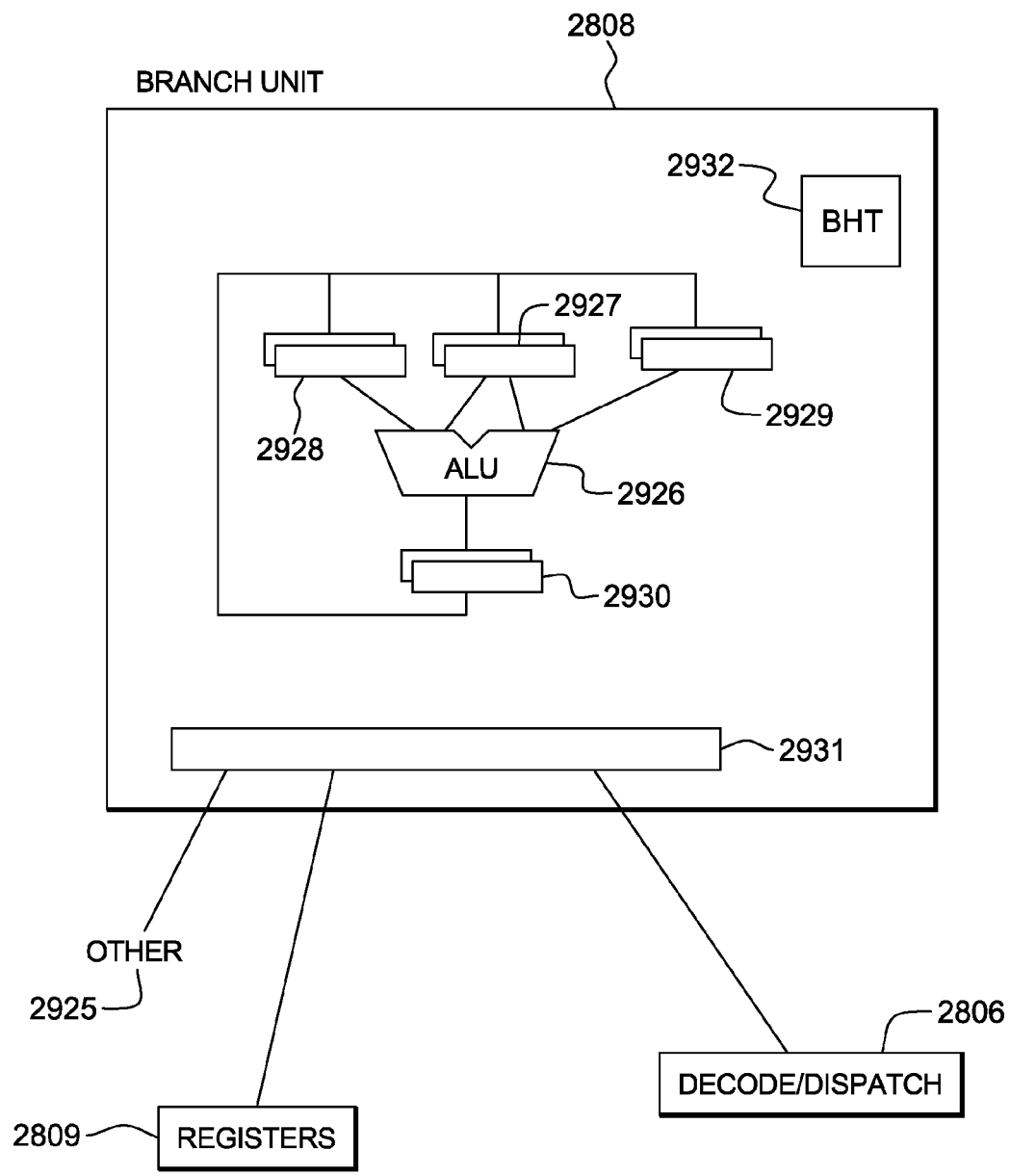
FIG. 29B depicts one embodiment of the branch unit of the computer system of FIG. 28, to incorporate and use one or more aspects of the present invention.

Referring to FIG. 29B, branch instruction information for executing a branch instruction is typically sent to a branch unit 2808 which often employs a branch prediction algorithm such as a branch history table 2932 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 2808 may employ an ALU 2926 having a plurality of input register circuits 2927, 2928, 2929 and an output register circuit 2930. The branch unit 2808 may communicate with general registers 2809, decode dispatch unit 2806 or other circuits 2925 for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment) for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture® long displacement facility wherein the instruction defines a base register, an Index register and an immediate field (displacement field) that are added together to provide the address of the operand in memory for example. Location herein typically implies a location in main memory (main storage) unless otherwise indicated.

Figure 29C:
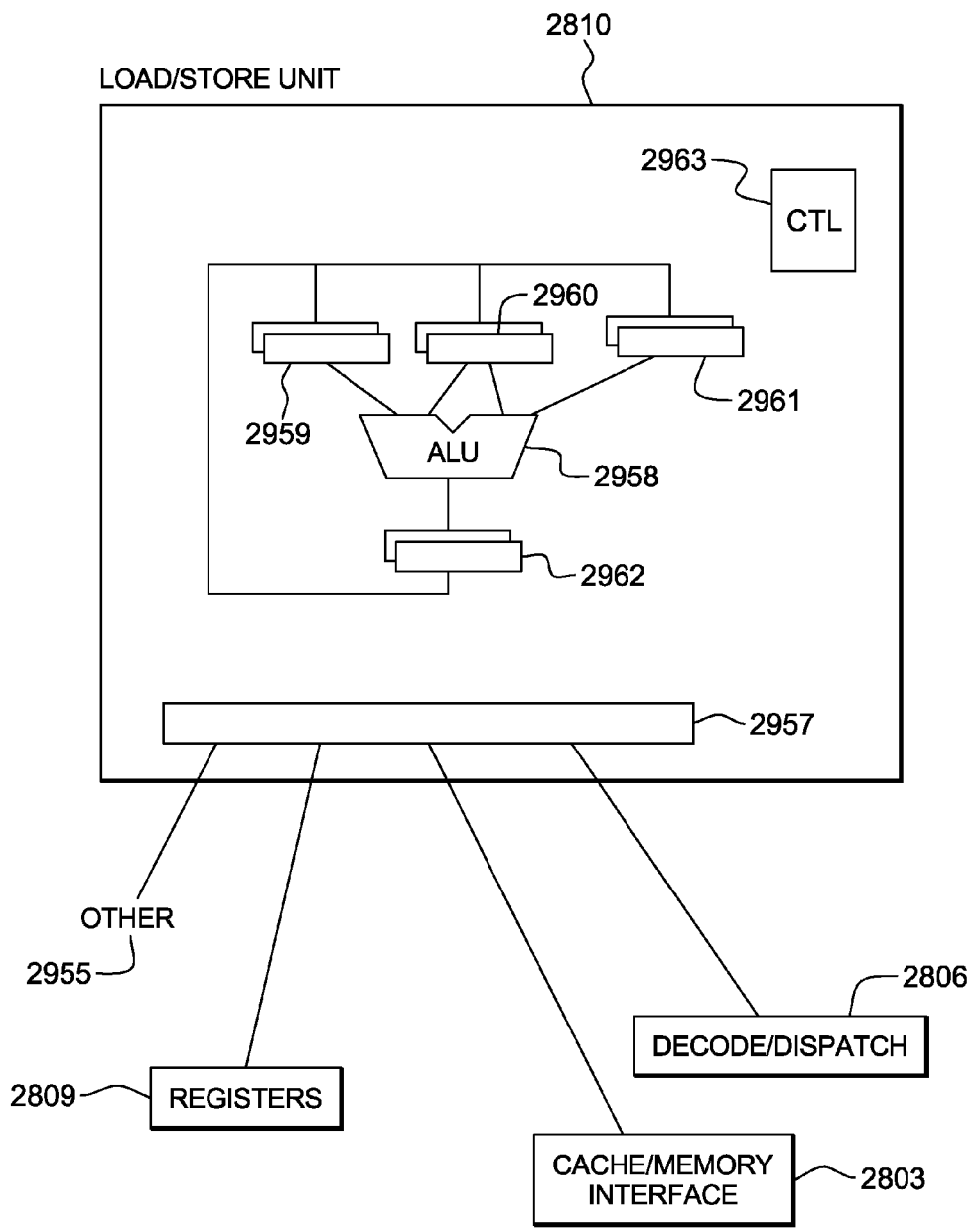
FIG. 29C depicts one embodiment of the load/store unit of the computer system of FIG. 28, to incorporate and use one or more aspects of the present invention.

Referring to FIG. 29C, a processor accesses storage using a load/store unit 2810. The load/store unit 2810 may perform a load operation by obtaining the address of the target operand in memory 2803 and loading the operand in a register 2809 or another memory 2803 location, or may perform a store operation by obtaining the address of the target operand in memory 2803 and storing data obtained from a register 2809 or another memory 2803 location in the target operand location in memory 2803. The load/store unit 2810 may be speculative and may access memory in a sequence that is out-of-order relative to instruction sequence, however the load/store unit 2810 must maintain the appearance to programs that instructions were executed in order. A load/store unit 2810 may communicate with general registers 2809, decode/dispatch unit 2806, cache/memory interface 2803 or other elements 2955 and comprises various register circuits, ALUs 2958 and control logic 2963 to calculate storage addresses and to provide pipeline sequencing to keep operations in-order. Some operations may be out of order but the load/store unit provides functionality to make the out of order operations to appear to the program as having been performed in order as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to simply prefixing a virtual address with an offset value, translating the virtual address via one or more translation tables, the translation tables preferably comprising at least a segment table and a page table alone or in combination, preferably, the segment table having an entry pointing to the page table. In z/Architecture®, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources such as I/O, caches, TLBs and memory interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 2804 (FIG. 28) provide the processor with means for attaching to peripheral devices including tape, disc, printers, displays, and networks for example. I/O units are often presented to the computer program by software drivers. In mainframes such as the z/Series® from IBM, channel adapters and open system adapters are I/O units of the mainframe that provide the communications between the operating system and peripheral devices.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers often by way of a compiler application. These instructions stored in the storage medium may be executed natively in a z/Architecture® IBM Server, or alternatively in machines executing other architectures. They can be emulated in the existing and in future IBM mainframe servers and on other machines of IBM (e.g. pSeries® Servers and xSeries® Servers). They can be executed in machines running Linux on a wide variety of machines using hardware manufactured by IBM®, Intel®, AMD™, Sun Microsystems and others. Besides execution on that hardware under a z/Architecture®Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Not withstanding, the emulation software must maintain the architecture rules of the emulated processor architecture so as to assure operating systems and applications written for the emulated processor operate correctly. Furthermore the emulation software must provide resources identified by the emulated processor architecture including, but not limited to control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al., and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut; and many others, illustrate the a variety of known ways to achieve emulation of an instruction format architected for a different machine for a target machine available to those skilled in the art.

Figure 30:
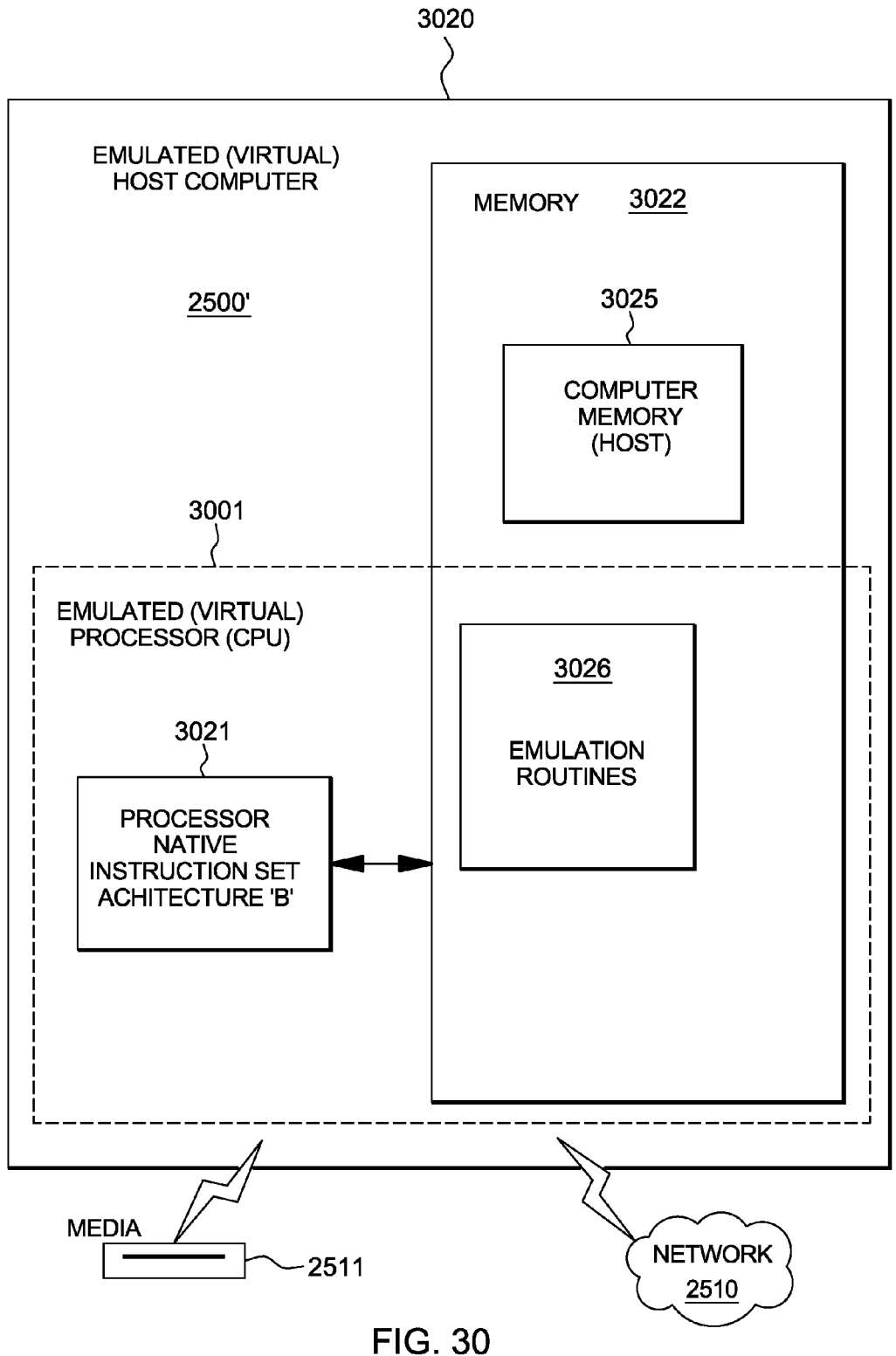
FIG. 30 depicts one embodiment of an emulated host computer system to incorporate and use one or more aspects of the present invention.

In FIG. 30, an example of an emulated host computer system 3020 is provided that emulates a host computer system 2500' of a Host architecture. In the emulated host computer system 3020, the host processor (CPU) 3001 is an emulated host processor (or virtual host processor) and comprises an emulation processor 3021 having a different native instruction set architecture than that of the processor 3001 of the host computer 2500'. The emulated host computer system 3020 has memory 3022 accessible to the emulation processor 3021. In the example embodiment, the memory 3022 is partitioned into a host computer memory 3025 portion and an emulation routines 3026 portion. The host computer memory 3025 is available to programs of the emulated host computer 3020 according to host computer architecture. The emulation processor 3021 executes native instructions of an architected instruction set of an architecture other than that of the emulated processor 3001, the native instructions obtained from emulation routines memory 3026, and may access a host instruction for execution from a program in host computer memory 3025 by employing one or more instruction(s) obtained in a sequence & access/decode routine which may decode the host instruction(s) accessed to determine a native instruction execution routine for emulating the function of the host instruction accessed. Other facilities that are defined for the host computer system 2500' architecture may be emulated by architected facilities routines, including such facilities as general purpose registers, control registers, dynamic address translation and I/O subsystem support and processor cache for example. The emulation routines may also take advantage of function available in the emulation processor 3021 (such as general registers and dynamic translation of virtual addresses) to improve performance of the emulation routines. Special hardware and off-load engines may also be provided to assist the processor 3021 in emulating the function of the host computer 2500'.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer system for facilitating processing of a multiprocessor computer system, the computer system comprising:
a memory; and
a processor in communications with the memory, wherein the computer system is capable of performing a method, the method comprising:
setting, in association with invalidate page table entry processing, an existing storage key at a matching location in central storage of the multiprocessor computer system to a predefined value, wherein the predefined value comprises a first fetch component and a first access component; and
subsequently executing a request to update the predefined value of the existing storage key to a new value, wherein the new value comprises a second fetch component and a second access component, the subsequently executing including determining whether the predefined value is an allowed stale value by comparing the predefined value to the new value, wherein at least one of: the first fetch component is not equal to the second fetch component, or the first access component is not equal to the second access component, and
responsive to the comparing determining that the predefined value is the allowed stale value, replacing in central storage the predefined value of the existing storage key with the new value without requiring purging or updating of the predefined value in local storage keys in any local processor cache of the multiprocessor computer system, thereby minimizing interprocessor communication pursuant to processing of the request to update the predefined value of the existing storage key to a new value.

2. The computer system of claim 1, wherein the determining includes determining with reference to the new storage key whether the predefined value of the storage key at the matching location in central storage is an equivalent stale value, and responsive to the predefined value being the equivalent stale value, leaving in central storage the storage key of predefined value without requiring purging or updating of the storage key of predefined value from any local processor cache of the multiprocessor computer system.

3. The computer system of claim 2, further comprising replacing the storage key of predefined value in central storage with the new storage key responsive to the predefined value being an allowed stale value other than the equivalent stale value, wherein the replacing is without requiring updating of the storage key in any local processor cache of the multiprocessor computer system, the allowed stale value comprising a predefined allowed stale value(s) for at least one required component of the storage key.

4. The computer system of claim 1, wherein the setting comprises setting, in association with invalidate page table entry processing, the storage key at the matching location in central storage of the multiprocessor computer system to a universal stale value, the universal stale value being predefined independent of the new storage key and comprising a predefined allowed stale value(s) for at least one required component of the storage key.

5. The computer system of claim 1, wherein the first access component is a value 0x0 when it is not equal to the second access component, and the first fetch component is a value 1 when it is not equal to the second fetch component.

6. A computer program product for facilitating processing of a multiprocessor computer system, the computer program product comprising:
a non-transitory storage medium readable by a processing circuit and storing instructions for execution by the processing circuit for performing a method comprising:

setting, in association with invalidate page table entry processing, an existing storage key at a matching location in central storage of the multiprocessor computer system to a predefined value, wherein the predefined value comprises a first fetch component and a first access component; and subsequently executing a request to update the predefined value of the existing storage key to a new value, wherein the new value comprises a second fetch component and a second access component, the subsequently executing including determining whether the predefined value is an allowed stale value by comparing the predefined value to the new value, wherein at least one of: the first fetch component is not equal to the second fetch component, or the first access component is not equal to the second access component, and responsive to the comparing determining that the predefined value is the allowed stale value, replacing in central storage the predefined value of the existing storage key with the new value without requiring purging or updating of the predefined value in local storage keys in any local processor cache of the multiprocessor computer system, thereby minimizing interprocessor communication pursuant to processing of the request to update the predefined value of the existing storage key to a new value.

7. The computer program product of claim 6, wherein the determining includes determining with reference to the new storage key whether the predefined value of the storage key at the matching location in central storage is an equivalent stale value, and responsive to the predefined value being the equivalent stale value, leaving in central storage the storage key of predefined value without requiring purging or updating of the storage key of predefined value from any local processor cache of the multiprocessor computer system.

8. The computer program product of claim 7, further comprising replacing the storage key of predefined value in central storage with the new storage key responsive to the predefined value being an allowed stale value other than the equivalent stale value, wherein the replacing is without requiring updating of the storage key in any local processor cache of the multiprocessor computer system, the allowed stale value comprising a predefined allowed stale value(s) for at least one required component of the storage key.

9. The computer program product of claim 6, wherein the setting comprises setting, in association with invalidate page table entry processing, the storage key at the matching location in central storage of the multiprocessor computer system to a universal stale value, the universal stale value being predefined independent of the new storage key and comprising a predefined allowed stale value(s) for at least one required component of the storage key.

\* \* \* \* \*